Figure 1:
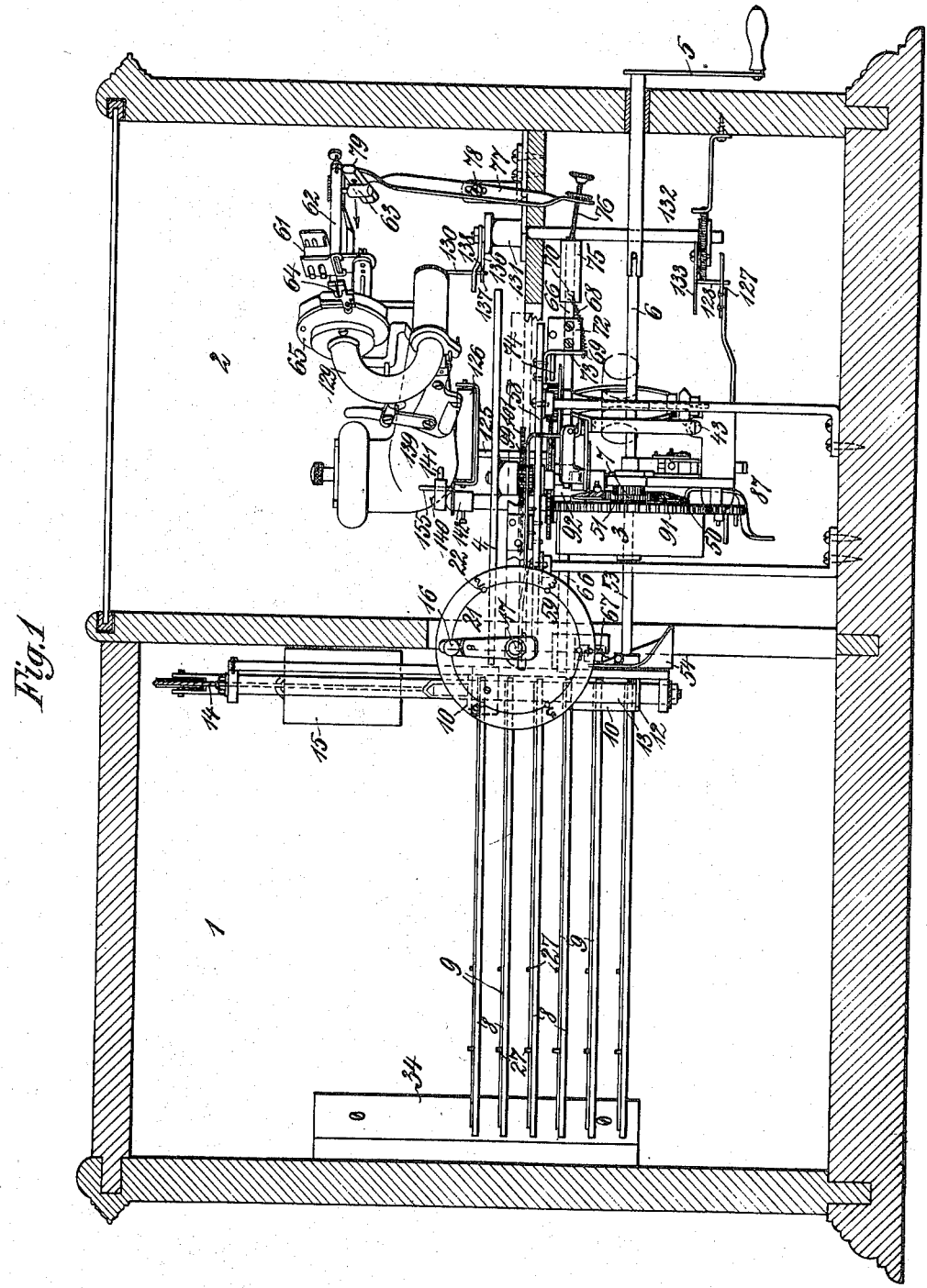

C. VOGT.
TALKING MACHINE.
APPLICATION FILED FEB. 6, 1906.

1,034,664.

Patented Aug. 6, 1912.
16 SHEETS—SHEET 5.

Witnesses
F. C. Barry
Aaron B. Moulton

Inventor
Clarence Vogt
by Horace Pettit
Attorney

C. VOGT.
TALKING MACHINE.
APPLICATION FILED FEB. 6, 1906.

1,034,664.

Patented Aug. 6, 1912.
16 SHEETS—SHEET 6.

Witnesses
F. C. Barry
Alston B. Moulton

Inventor
Clarence Vogt
by Horace Pettit
Attorney

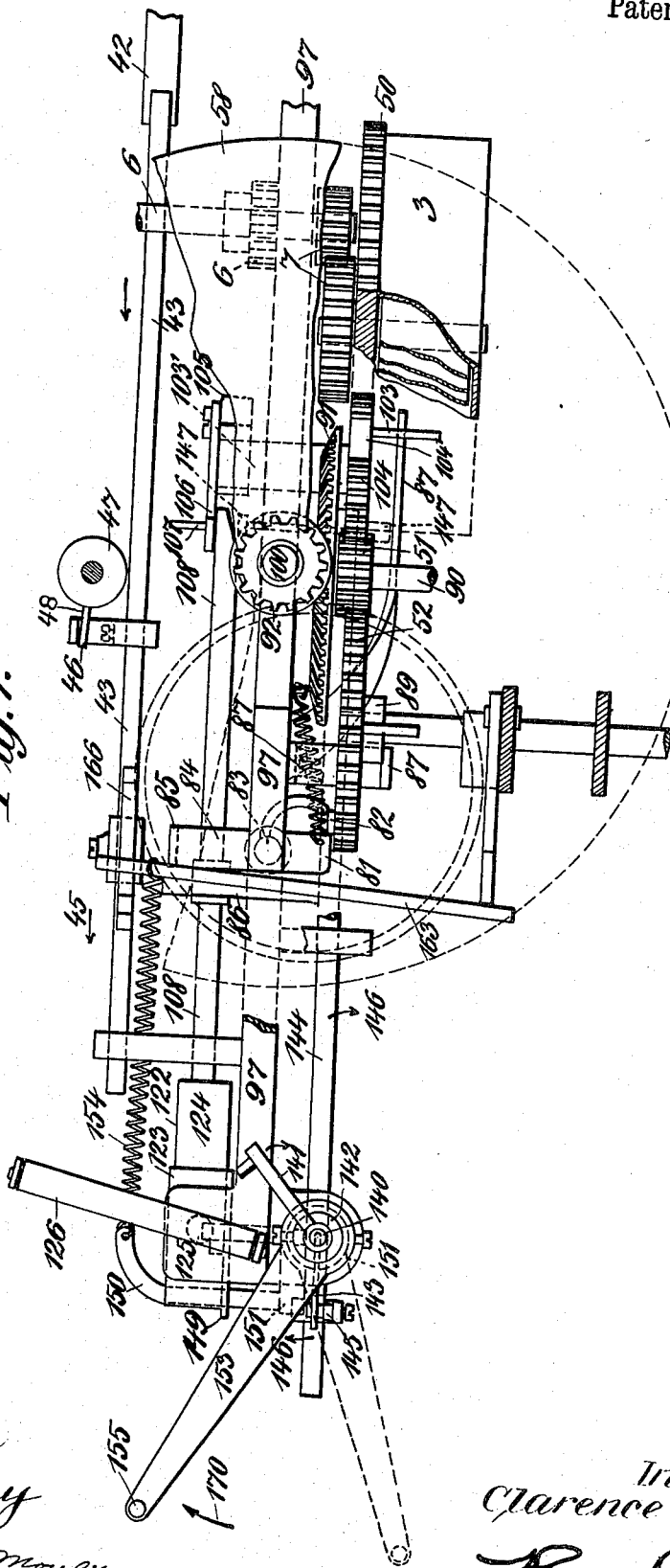

C. VOGT.
TALKING MACHINE.
APPLICATION FILED FEB. 6, 1906.
1,034,664.
Patented Aug. 6, 1912.
16 SHEETS—SHEET 8.
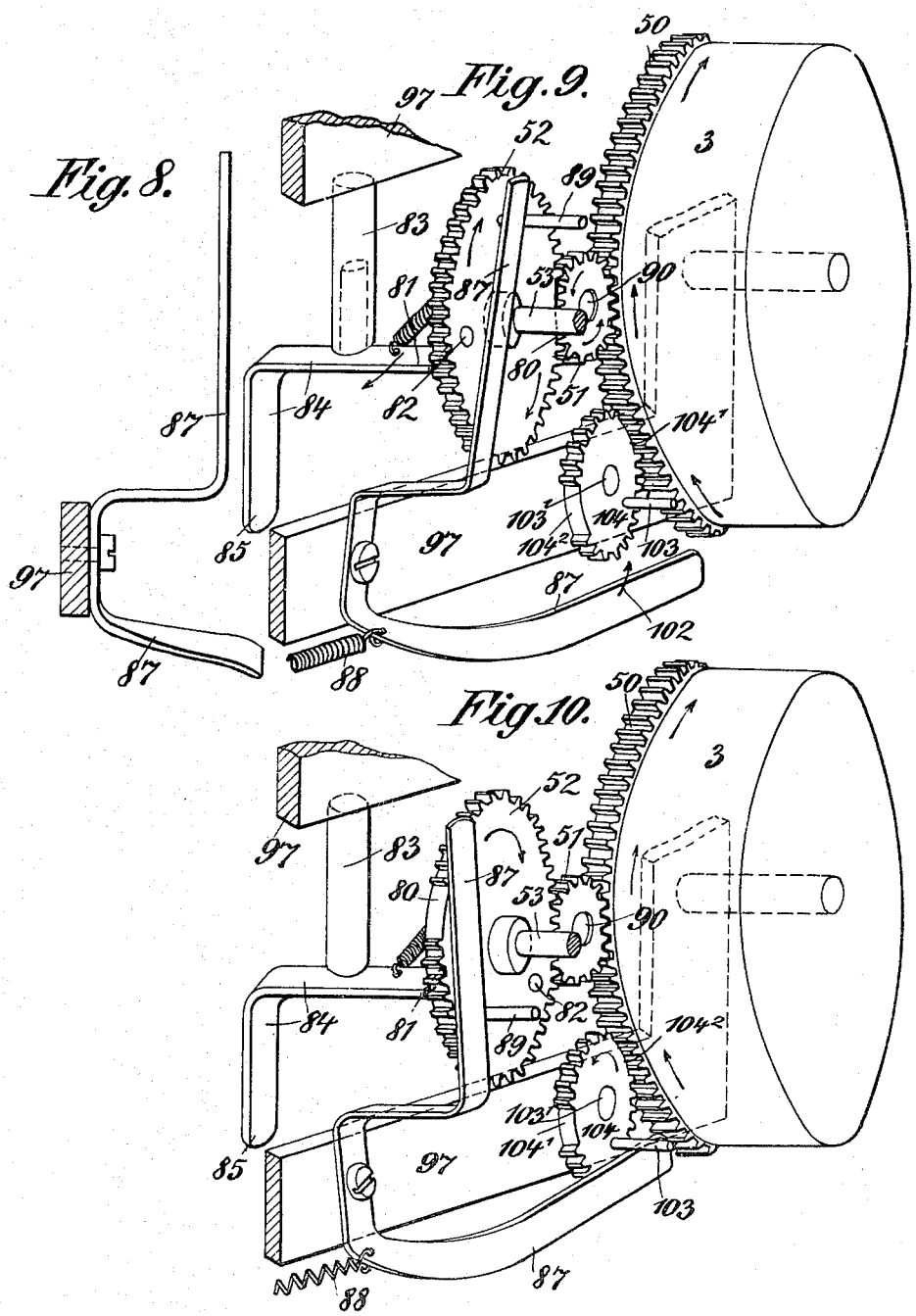

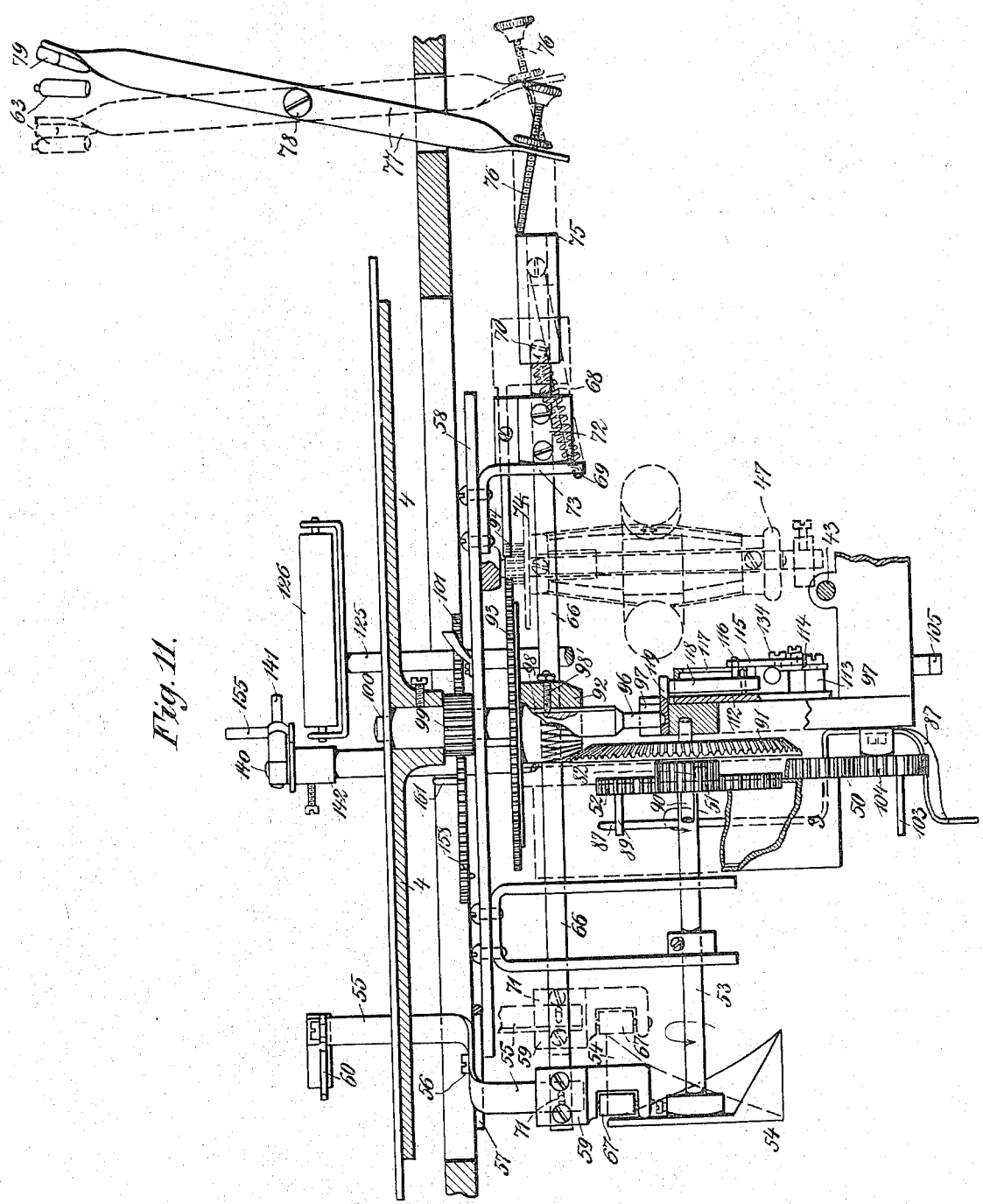

C. VOGT.
TALKING MACHINE.
APPLICATION FILED FEB. 6, 1908.

1,034,664.

Patented Aug. 6, 1912.
16 SHEETS—SHEET 10.

Witnesses
F. C. Barry
Alston B. Moulton

Inventor
Clarence Vogt
by Laura Pettit
Attorney

C. VOGT.
TALKING MACHINE.
APPLICATION FILED FEB. 6, 1906.

1,034,664.

Patented Aug. 6, 1912.
16 SHEETS—SHEET 11.

C. VOGT.
TALKING MACHINE.
APPLICATION FILED FEB. 6, 1906.

1,034,664.

Patented Aug. 6, 1912.
16 SHEETS—SHEET 13.

Witnesses
F. E. Barry

Inventor
Clarence Vogt
by Horace Pettit
Attorney

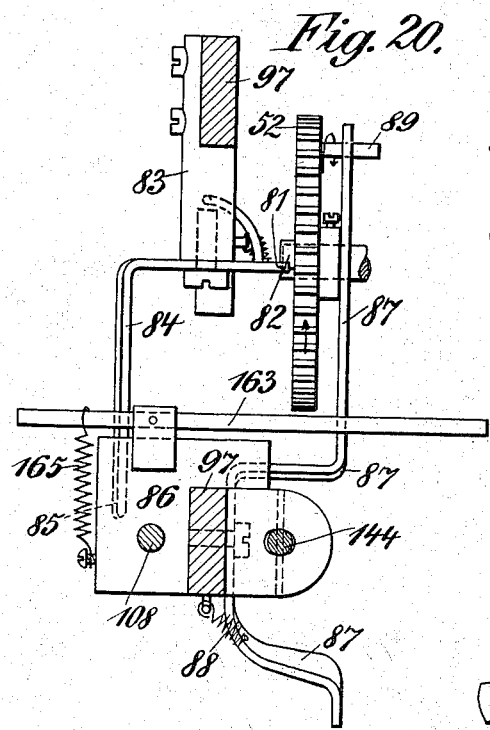
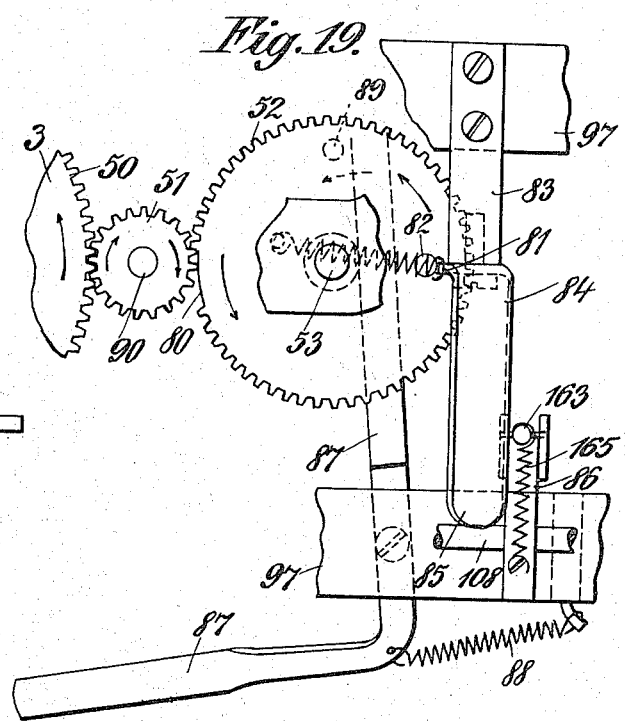
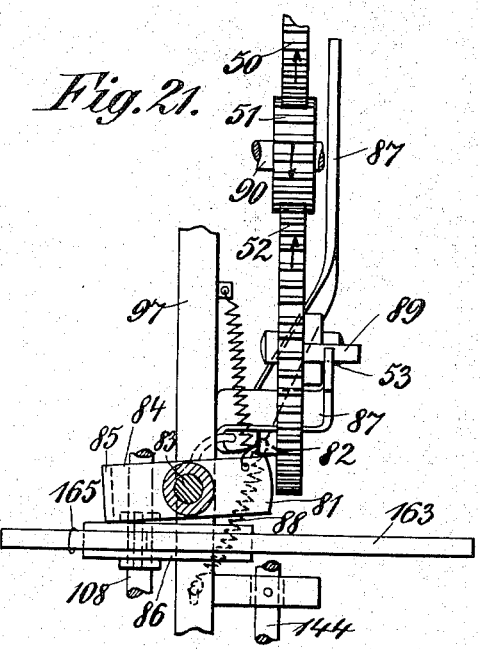
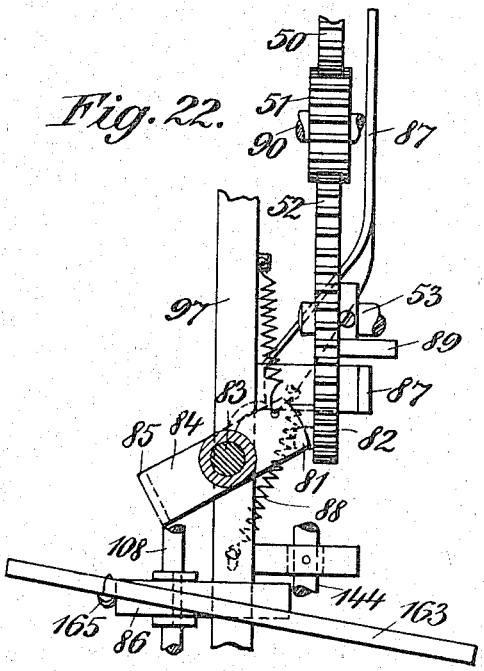

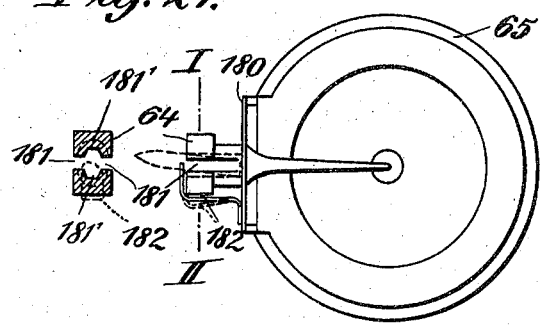
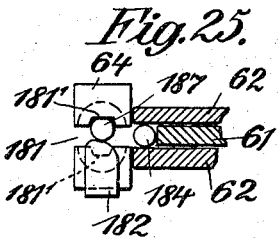
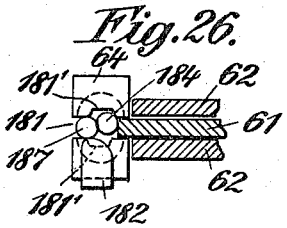
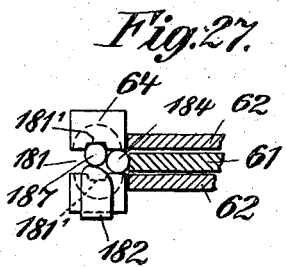
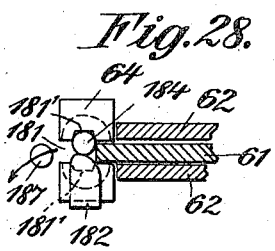

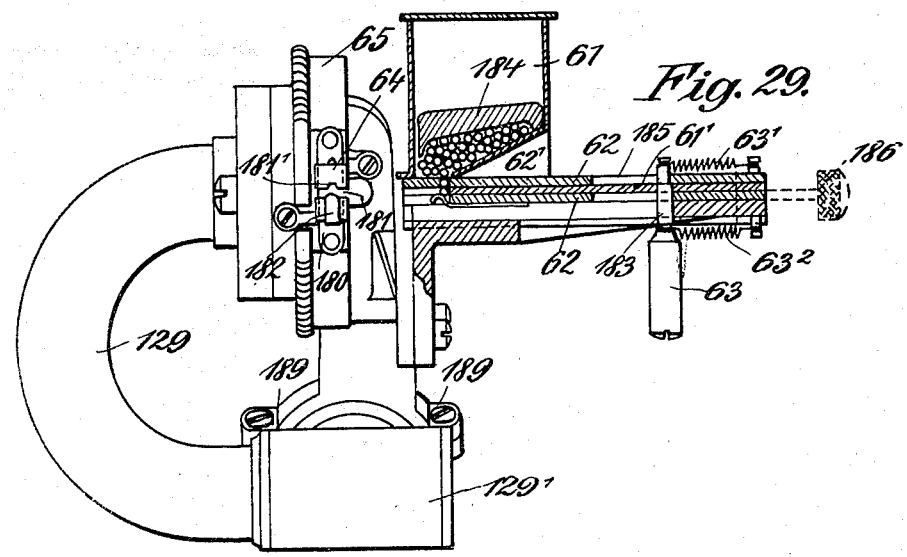
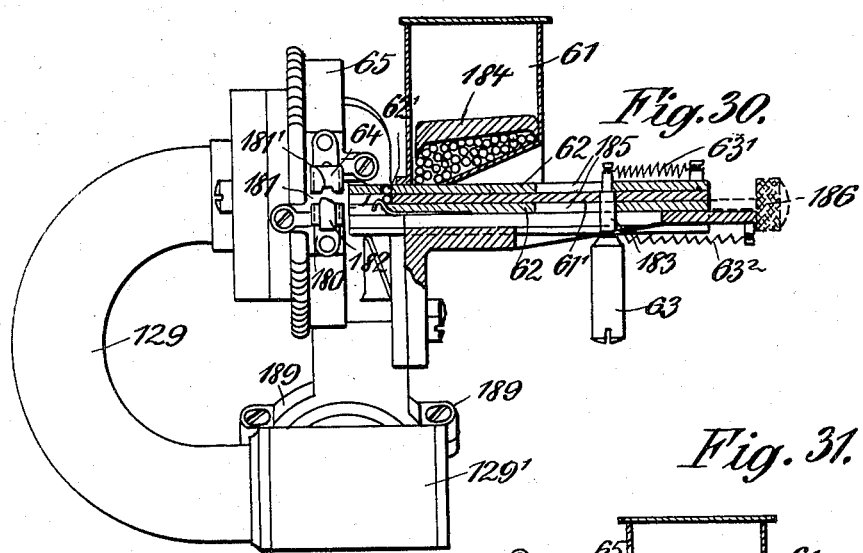
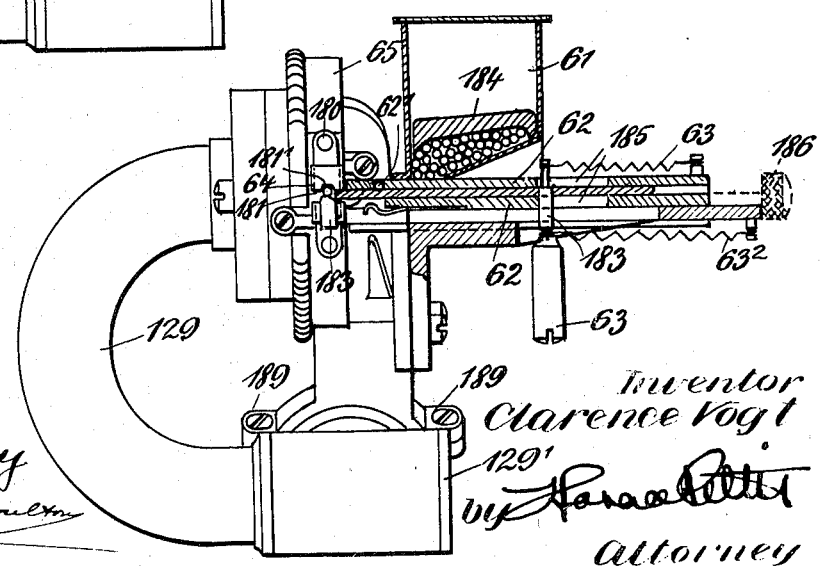

UNITED STATES PATENT OFFICE.

CLARENCE VOGT, OF BERLIN, GERMANY, ASSIGNOR TO THE FIRM OF THE GRAMO-PHONE & TYPEWRITER LTD., OF LONDON, ENGLAND.

TALKING-MACHINE.

1,034,664.   Specification of Letters Patent.   Patented Aug. 6, 1912.

Application filed February 6, 1906. Serial No. 299,887.

*To all whom it may concern:*

Be it known that I, CLARENCE VOGT, a citizen of the United States of America, and residing at Berlin, in the German Empire, have invented certain new and useful Improvements in Talking-Machines, of which the following is a specification.

This invention relates to a coin-freed disk-talking machine with means for enabling any desired record-disk to be selected.

One important feature of the improved machine consists in the fact that the record-disks are carried by frames pivotally mounted in a storage-receptacle and that these frames can be automatically swung into and out of the receptacle by means of the driving mechanism, so as to bring them into or out of their operative position.

Another important feature of the said invention consists in the fact that the swinging out of the disk-frame can be utilized for the changing of the sound-box-needle, so that all operations of the apparatus are performed automatically.

The special form of construction of the rising and falling turntable is also important.

As regards the operation of the machine generally, an important feature consists in the fact that the use of slideways, more especially for the movement of the record-disks, is avoided and that consequently the driving power required for carrying out all the operations does not have to be very great. Moreover the record-disks can be conveniently changed, since the round frames can be made easily accessible from all sides in the storage-chamber.

Further advantages result from the whole arrangement, by reason of the certainty of sequence of the operations, due to the method adopted for disposing the several mechanisms relatively to each other.

One example of construction of the coin-freed talking machine is shown in the drawings.

Figure 2:
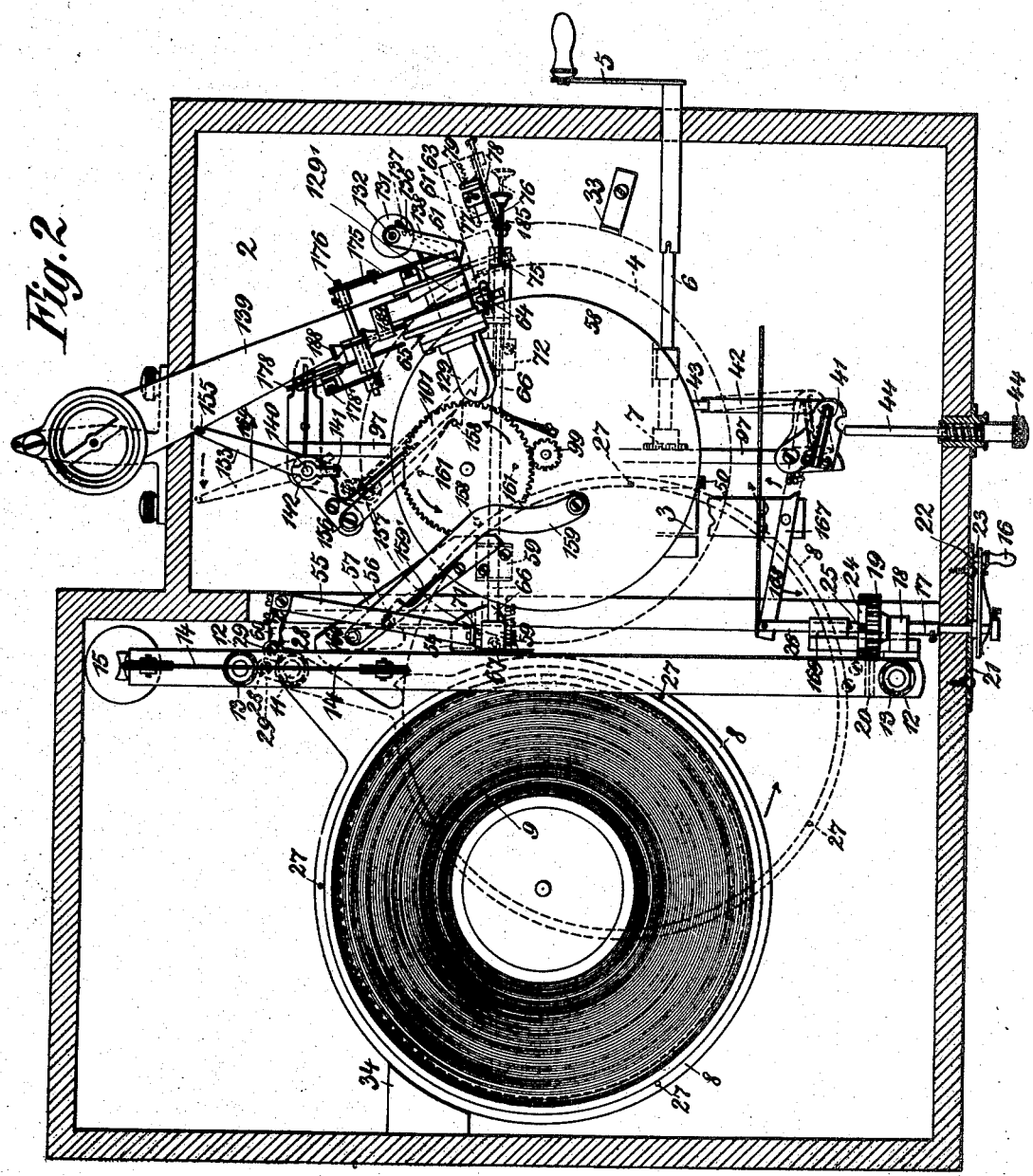
Figure 3:
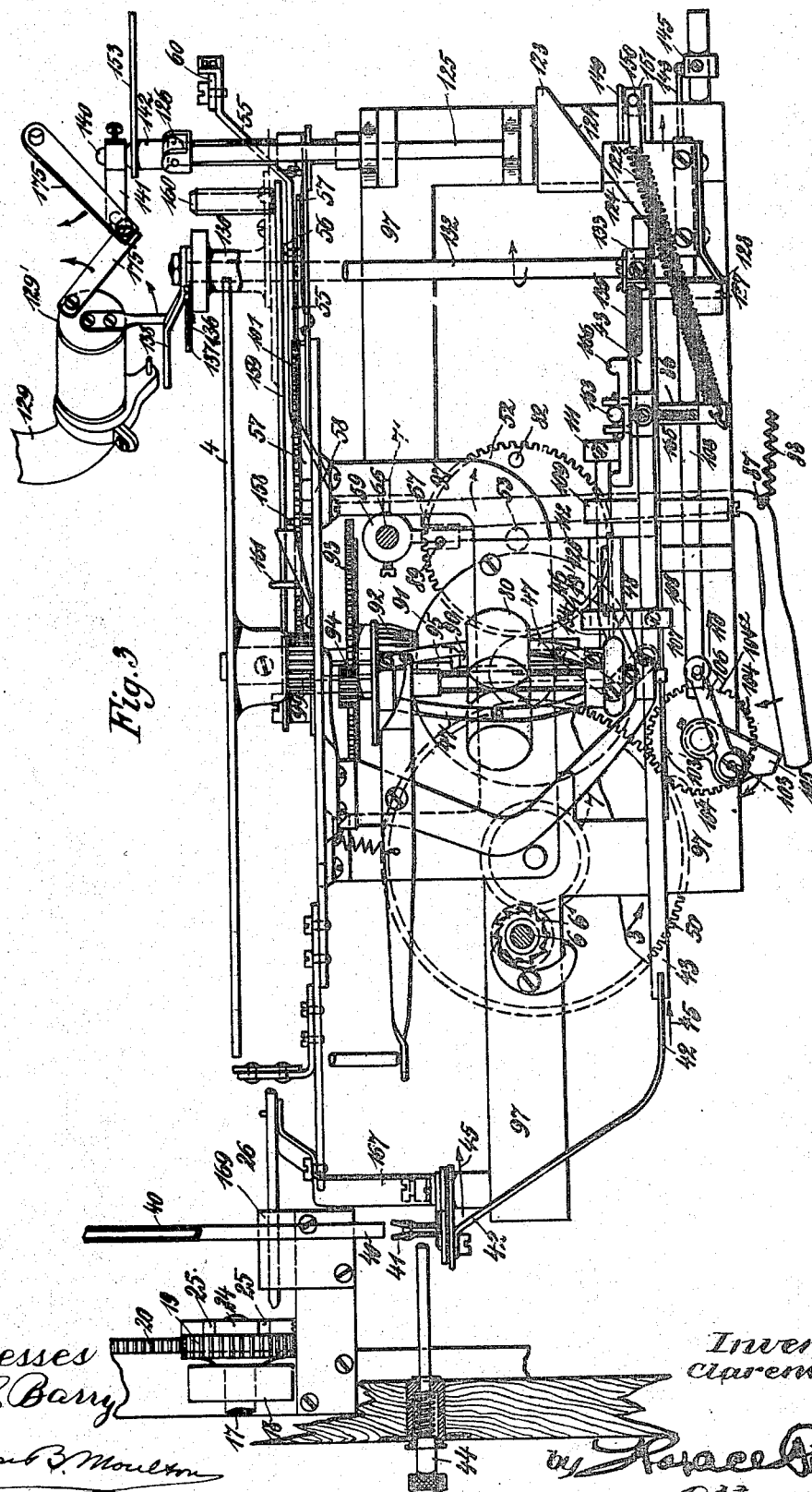
Figure 4:
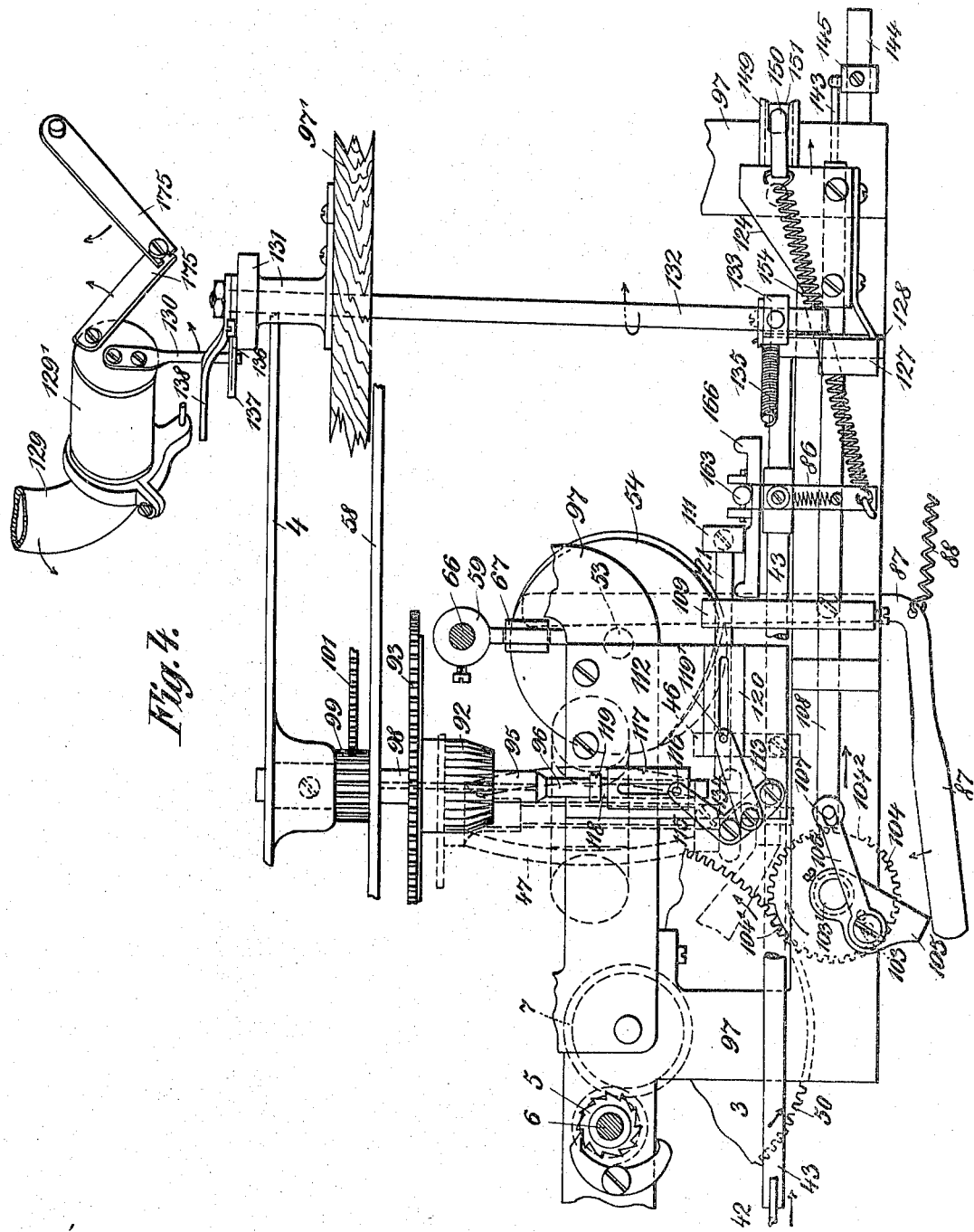
Figure 5:
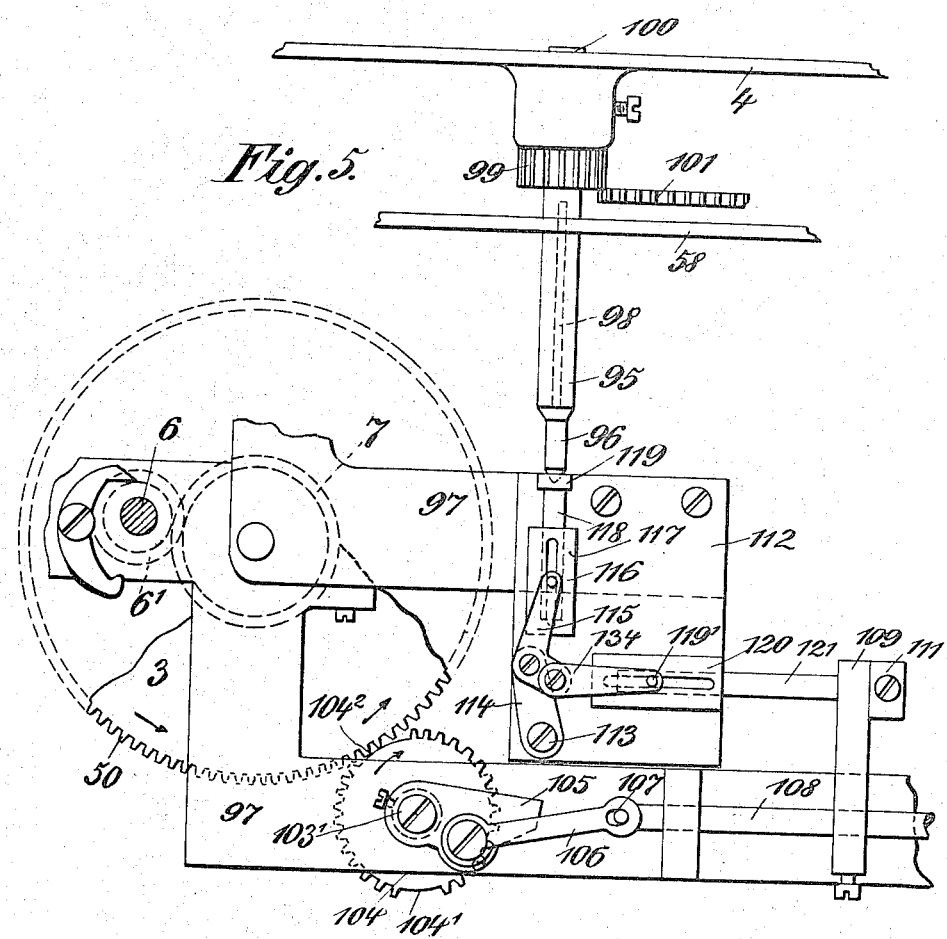
Figure 6:
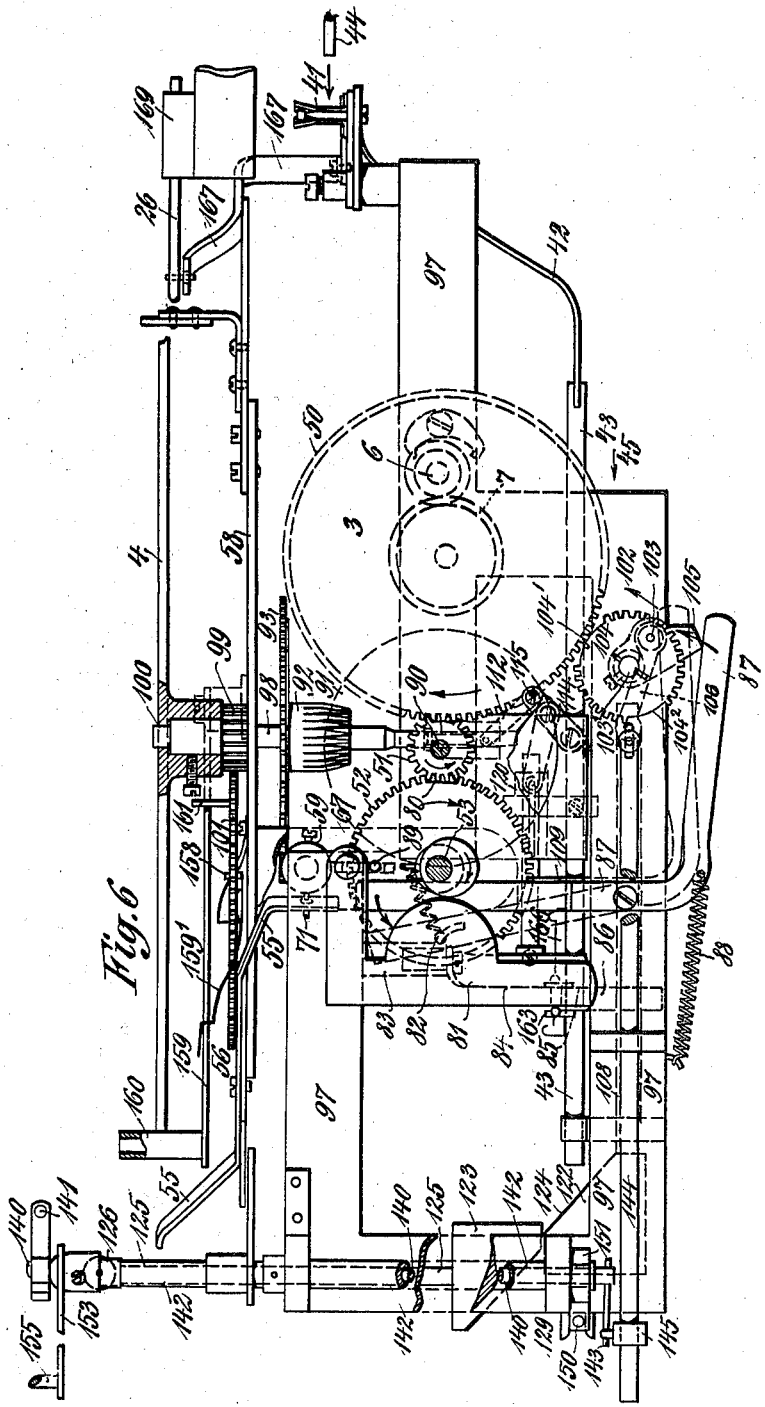
Figure 12:
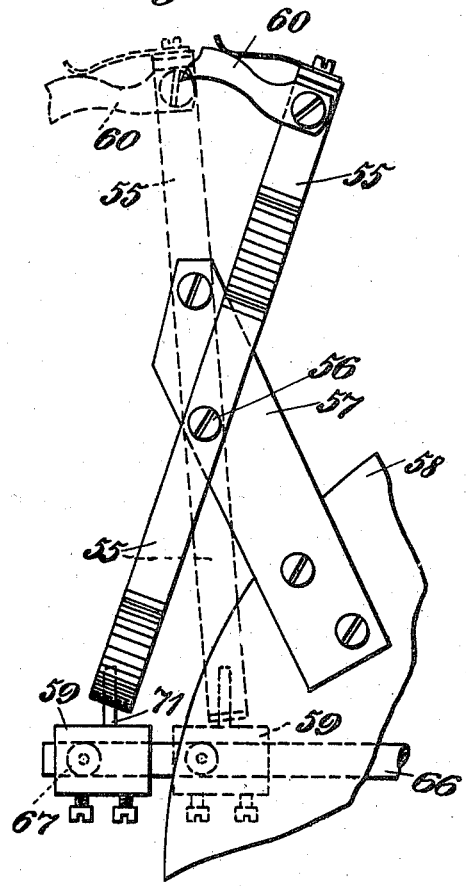
Figure 14:
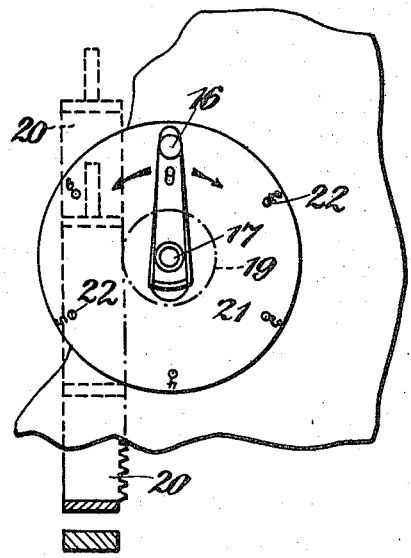
Figure 15:
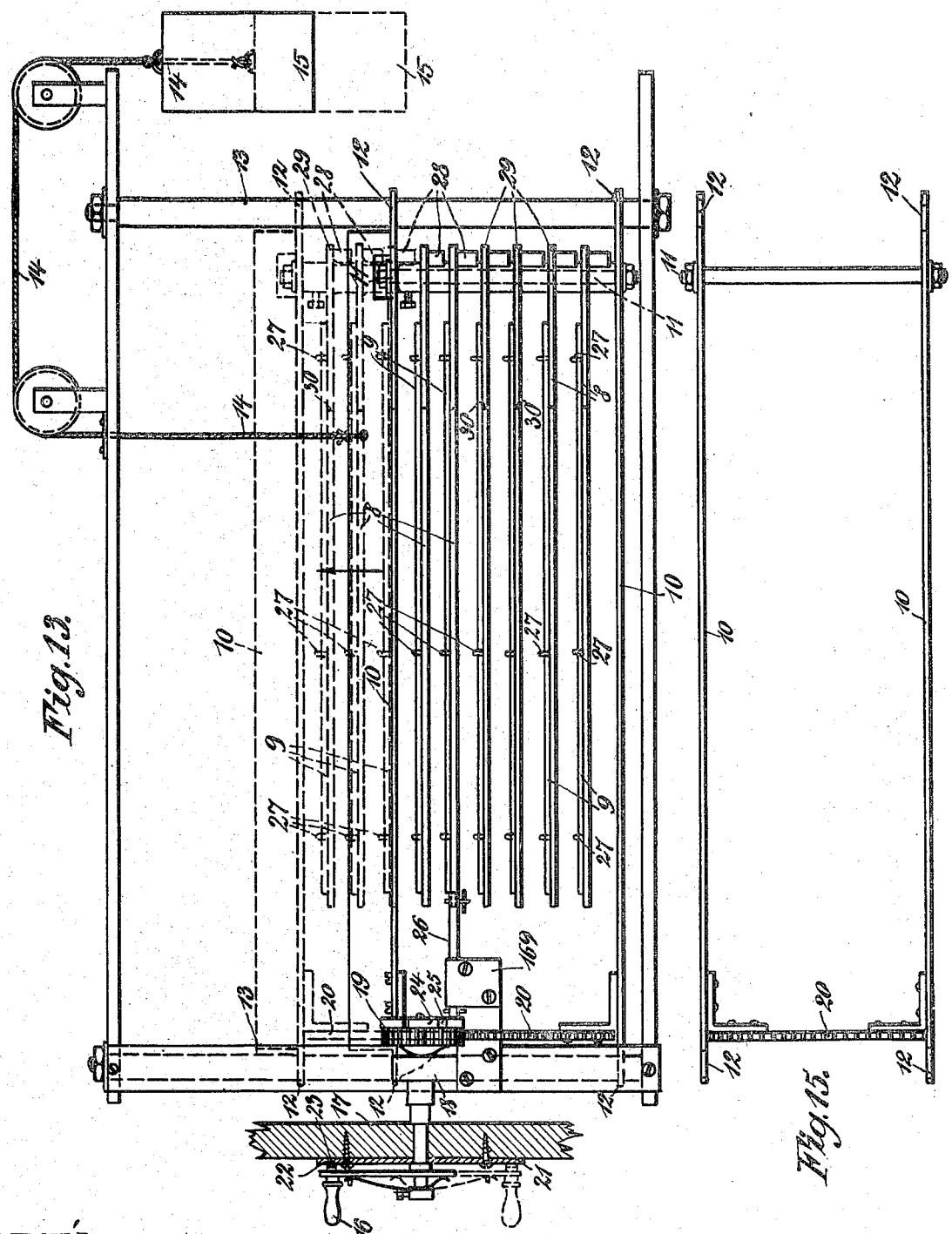
Figure 16:
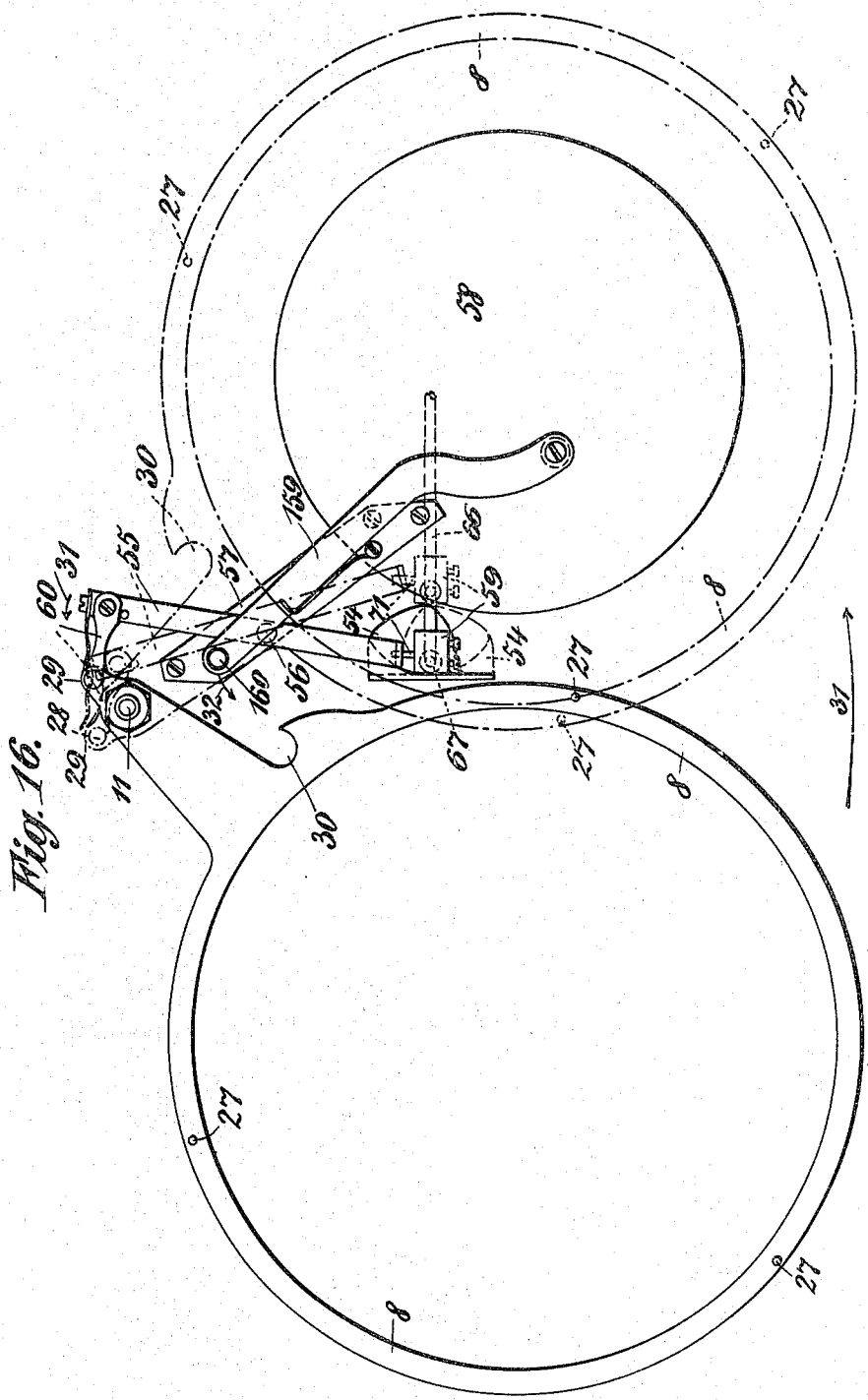
Figure 17:
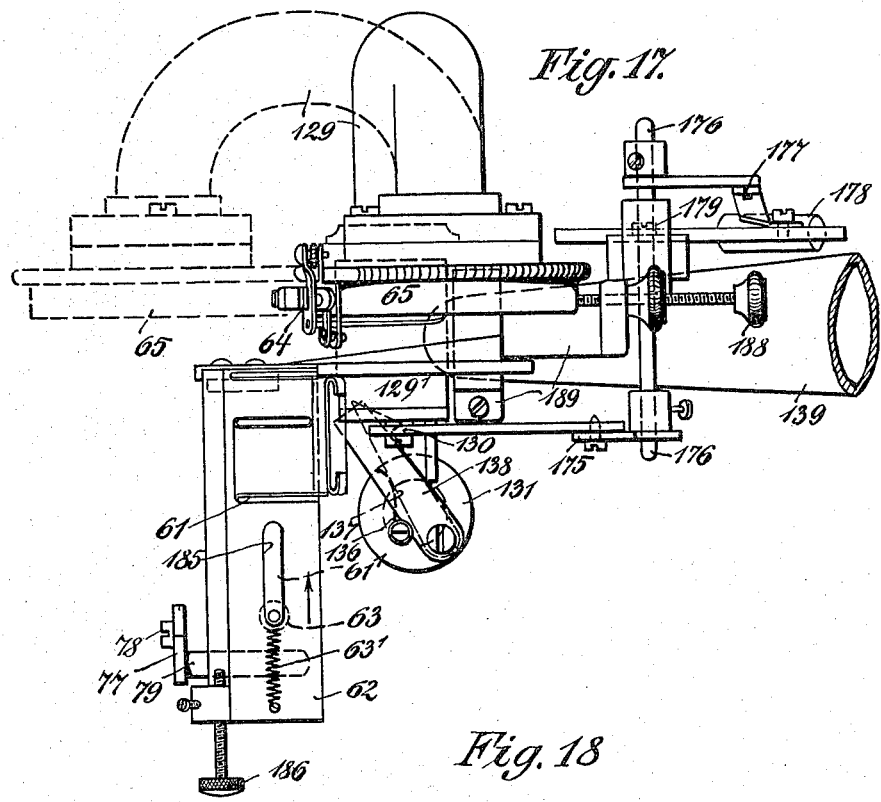
Figure 18:
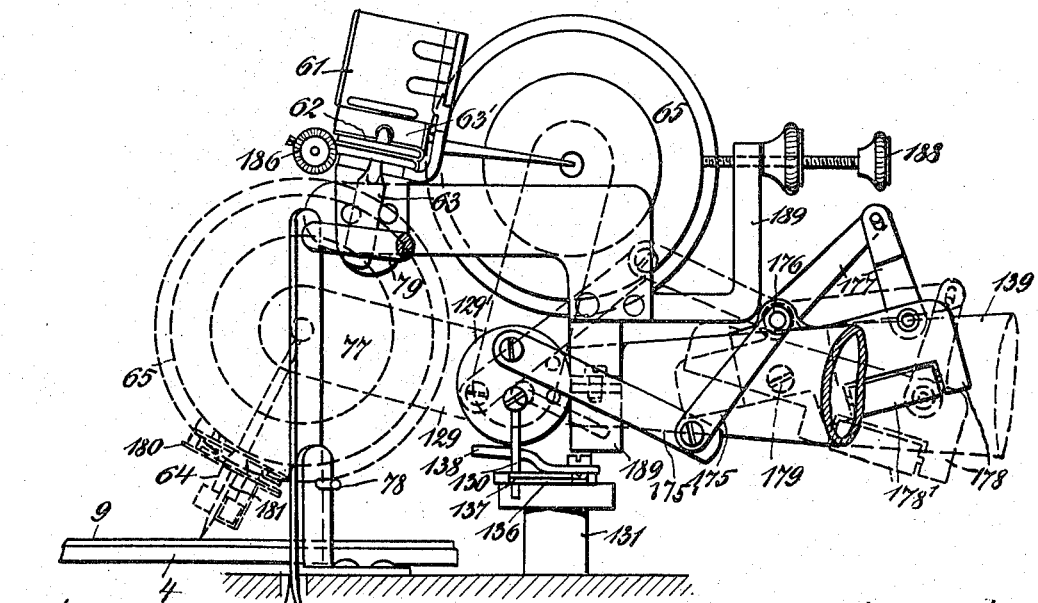

Figure 1 shows the talking machine in side elevation with the side wall removed. Fig. 2 shows the same in plan, one of the disk-changing frames being shown in dotted lines in its mid-position. Fig. 3 shows in front elevation the arrangement of the parts controlling the various operations of the apparatus, the hollow radial arm, the needle-changer, etc., being omitted. Figs. 4 and 5 show the lifting device for the turntable in two positions. Fig. 4 also shows in front elevation the device whereby the radial arm is held locked during the changing of the needles. Fig. 6 shows the operating mechanism in rear-elevation, more especially the device for controlling the elevation and depression of the sound-box. Fig. 7 shows in plan the most important of the parts occuring in Fig. 6. Figs. 8 to 10 inclusive, show the position and operation of the lever for controlling the operations of elevating and depressing the table and of elevating and depressing the sound-box in their proper sequence. Fig. 11 is a side elevation of the driving mechanism showing mainly those parts which serve for raising and lowering the turntable, for moving the disk-frames, and also for actuating the needle changer. Fig. 12 shows in plan the lever which is shown in elevation in Fig. 11, for moving the disk-frames. Fig. 13 shows the disk-changer in front elevation, and Fig. 14 shows the corresponding setting device in side elevation. Fig. 15 is a detail view of the slide carrying the movable disk-frames. Fig. 16 shows in plan a disk-frame with the corresponding parts in their inoperative and operative positions. Figs. 17 and 18 show the sound-box arm with the needle-changer and also the locking piece for the radial arm in plan and in front elevation respectively. Figs. 19 to 22 inclusive are detail views of the arrangement for controlling the actuating mechanism for the needle-changer and for throwing into and out of action the crank gear-wheel. Fig. 23 is a side elevation of the sound-box with the needle-holder. Fig. 24 is a cross-section of the holder on the line I—II, Fig. 23. Figs. 25 to 28 inclusive are diagrams illustrating the operation of changing the needles. Figs. 29 to 31 inclusive show the needle changer in section and side elevation in various positions in its operation.

In the forms of construction shown, the complete operation of the machine is composed of the following steps:—After the winding up of the talking machine, the adjustment of the record-disk and the insertion of the coin, all operations are performed automatically. The manipulation of the talking machine above mentioned may be termed the setting and release. All operations therefore follow each other in the manner hereinafter set forth:—

1. The setting of a disk and release of the driving mechanism by the insertion of a coin.
2. The swinging of the disk-frame with the record-disk into the operative position.
3. Setting in action of the needle-changer for the purpose of simultaneously removing the needle from the sound-box after the preceding operation of the machine and inserting a new needle.
4. Raising the turntable for the purpose of removing a record-disk from its frame, in which operation it is preferable that the turntable shall be already in motion. By this means, both the removal of the record-disk is facilitated and also time is saved, so that the subsequent action of placing the needle on said disk can take place without delay.
5. Depression of the sound-box which, in the inoperative position of the talking machine, is raised. This process can directly follow that mentioned sub 4, since the record-disk rotates from the first at the normal velocity and thus no false notes can be produced by prematurely placing the sound-box in its operative position and increasing the velocity after the needle has been placed on the record-disk.
6. Releasing of the radial arm, which is held locked in its inoperative position, during the depression of the sound-box.
7. The operation proper, i. e., the talking or playing, in which all controlling parts are in a position of rest.
8. Return movement of the radial arm to the initial position by the spring pushing device released by the radial arm, the sound-box being lifted and the radial arm locked again at the same time.
9. Depression of the turntable, in which operation the used record-disk again comes to rest on the outwardly swung frame.
10. Swinging back of the frame with the record-disk into the storage chamber.
11. Stoppage of the driving gear and return of the coin-release to its initial position.
12. In combination with these steps, the actuation of a separate device, which holds the record-disk-changer locked during the operation of talking or playing, can also take place, and after the completion of the talking or playing, on stoppage of the driving mechanism, this device again releases the disk-changer to permit the fresh setting of the same.

The various arrangements will be hereinafter described in the same order as that given above.

The talking machine, in the example of construction shown, is arranged in a frame with two compartments or chambers, of which one compartment 1 serves for the reception of the supply of record-disks with their frames, while the other compartment 2 contains the talking or playing mechanism proper, as may be seen more especially from Figs. 1 and 2. The motor or the driving mechanism 3 serves for driving the turntable 4 which is arranged to turn about a vertical axis. In the form of construction shown, the motor consists of a spring which is wound up by means of a crank-handle 5, a shaft 6 and a train of gear-wheels 7.

In order to transfer the separate record-disks in the compartment 1 to the turntable 4, it is necessary to bring the various frames 8 lying one above the other, together with their record-disks 9, as they are selected, into such a position that the frame 8, the record-disk of which is to be used for the time being, lies somewhat higher than the turntable 4. The driving mechanism 3 then moves the disk-frame 8, while in this position, out of the compartment 1 into the compartment 2 and back again. For this purpose, all the disk-frames are arranged so as to be capable of turning separately about a pivot-shaft. Moreover the method of construction of the disk-changer in the compartment 1 and the method of operation when laying the record-disks on the turntable are shown in Figs. 13 to 16 inclusive and in Figs. 2 and 12 inclusive.

As shown in Fig. 15, the disk-changer consists of a slide 10, in which are arranged the disk-frames 8 one above the other. The disk-frames all swing independently of one another about a common pivot-shaft 11 on the slide 10. This slide is guided by means of the guide-eyes 12 on vertical rods 13 and by a cord 14 which extends over rollers and is provided with a counterweight 15, so that it, together with the record-disks and their frames, can be held at any desired height. A raised position of the slide with the disk-frames is shown in dotted lines in Fig. 13.

1. *The adjustment of the record-disks to the height required for use for the time being.*— That is to say, the adjustment of the slide 10 is effected by turning the hand-lever 16 on the shaft 17 (Figs. 13 and 14). This shaft 17, which is mounted at 18 on the frame of the disk-changer, bears the gear-wheel 19, which engages in a rack 20 on the slide 10. By turning the crank 16, the slide 10 is thus raised or lowered. In order to permit the correct adjustment of the slide and to facilitate the selection of the record-disk to be used for talking or playing for the time being, the crank 16 can be arranged, as shown in Fig. 14, in front of an indicator-dial 21 which can be divided to correspond with the number of disks available. This is preferably effected by means of holes 22, into which a pin 23 on the elastic crank 16 can snap. The gear-wheel 19 or a wheel 24 rigidly connected therewith can be provided with openings or recesses, with which during the talking or playing a locking pin 26 (Figs. 13 and 2) comes into engagement in the manner hereinafter explained, in such a manner that the gearing 19 and 20 is locked and the use of the disk-changer during talking or playing is prevented. The number of locking apertures 25 in the wheel 24 must obviously correspond to the number of disk-frames.

As shown in Figs. 13 and 16, the separate disk-frames 8 consist of rings, which has a somewhat greater external diameter than the disks lying thereon. The record-disks are held on the rings in their exact axial position by pins 27 provided on the said rings. The internal diameter of the disk-frames is somewhat greater than the diameter of the turntable 4, in order that, by raising and lowering the said table when the outwardly swung disk-frame is positioned axially above it, the disk 9 can be removed from its frame 8 and again deposited thereon. During the talking or playing, the disk-frame, swung outwardly for the time being, remains in this position, since the shaft of the turntable 4 extending through it would prevent it from being swung back.

The swinging outwardly and back of the separate disk-frames may advantageously take place by a push or a pull. In the form of construction shown, the disk-frames are provided, for the purpose of swinging them outwardly, with a knob 28, which is arranged on an extension 29 of the disk-frame projecting beyond the pivot shaft, and for the purpose of swinging them back, with a cam-shaped recess 30 on the opposite side of the pivot-shaft to the knob 28. Accordingly if pressure be exerted alternately at the places 28 and 30 in the direction of the arrows 31 and 32 shown in Fig. 16, the disk-frame will be thereby moved in one or the other direction about the shaft 11 in order to swing it outwardly or inwardly. The terminal positions (in the compartments 1 and 2) are determined by stops 33 and 34, in which arrangement, the stop 33 serves for insuring that the record-disk on the swung out frame shall be in the correct position over its fastening pins on the turntable 4.

The winding up of the driving mechanism can take place before or after the insertion of the coin. In this operation, the arrangement may be such that a single winding up is sufficient for a large number of complete operations of the machine. Instead of the spring driving mechanism, an electromotor or any other suitable driving apparatus can be provided, since the setting into and out of action of the motor is entirely independent of the method of supplying power thereto. In the example shown, the winding up of the spring motor 3 is effected by turning the shaft 6, which acts by means of the train of gearing 7 on the spring. To the shaft 6 is moreover connected a locking device 6', which in a known manner permits the turning of the winding up shaft 6 in one direction only and at the same time secures the tensioned spring against running down, Figs. 3 and 4.

The coin-release can be of any desired kind. In the form of construction illustrated in Fig. 2, 6 and 7, the coin-pocket 41 is arranged beneath the coin-slot 40 on the arm 42 of the releasing rod 43. After the insertion of a coin by pressing the knob 44, the rod 43 is moved in the direction of the arrow 45 (Fig. 7) by means of the coin, so as to cause the striking piece 46 to release the locking pin 48 on the governor 47, and allow the driving mechanism to run. There now follows:—

2. *The swinging out of the disk-frame with the record-disk into the operative position.*—As shown more especially in Figs. 6, 7, 11 and, in relation to the whole arrangement, also in Fig. 2, the toothed wheel 50 connected to the motor 3 drives the shaft 53 through the intermediate wheel 51 and the gear-wheel 52, see Figs. 9 and 10. The shaft 53 bears at one end the cam-disk 54 which acts on a two-armed lever 55 oscillating about, which pin. The pivot-pin 56 is arranged on an arm 57 attached to the frame-plate 58. One arm of the lever 55 is connected to the head 59 which is mounted on a longitudinally movable rod 66. The head 59 is itself pressed against the cam-disk 54 through its roller 67 by means of a spring 68, which is attached at one end, 69, to a part of the frame 58 and engages at the other end, 70, with the rod 66. This rod 66 also serves in the manner hereinafter described for actuating the needle-changer. The head 59 is connected to the reversing lever 55 through a pin 71. On the other arm of the lever 55, there is a spring presser or pawl 60, which on the outward swing of the lever is pressed against the knob 28 of one of the disk-frames 8. The dimensions of the cam-wheel 54 are such that the outward swing of the lever 55 takes place directly after the setting in action of the main driving-mechanism 3. By this means, the roller 67 with the head 59 moves out of the position shown in full lines in Fig. 11 into that shown in dotted lines. By the corresponding oscillation of the lever 55, a disk-frame 8 is turned about the shaft 11 and brought into the operative position over the turntable 4. A mid-position of the disk-frame is shown in dotted lines in Fig 2, while Fig. 16 also shows the operative position after the outward swing is completed.

Simultaneously with the outward swing of the disk-frame into the operative position, there takes place, in the example of construction shown, 3. *The setting in operation of the needle-changer.*—The needle-changer itself can be of any desired construction, but before that employed in the present example of construction is more fully described, the special construction of the needle-holder on the sound-box coacting therewith may be explained. It is advantageous to arrange the needle-holder in such a manner that the ejection of the needle, remaining in the needle-holder from the previous operation of the machine, takes place simultaneously with the injection of the new needle, by means of the slide of the needle changer. Accordingly, as can be seen from Figs. 23 and 24, the needle-holder 64, which in the example shown is movably attached to the sound-box 65, by means of the piece 180 with knife-edge support, is provided with a slot 181 extending through it for the introduction of the needle. In this longitudinal slot 181 are grooves 181' into which the needle is pressed by means of a spring 182 mounted on the piece 180. The spring 182 has its corners rounded at the end turned toward the slot 181 so that, on the one hand the insertion of a new needle is facilitated while on the other hand a sharp ejection of the already used needle is permitted on the opposite side. In the operative position of the sound-box 65 shown in dotted lines in Fig. 18, the needle is held obliquely in the grooves 181' of the slot 181 by the weight of the sound-box aided by the spring 182. This form of needle-holder provided with a longitudinal slot extending through it, is adapted for use with the needle-changer hereinafter described.

Care must be taken that the slide 61' of the needle-changer (the special function of which is to inject the new needle and eject the used one) shall be guided in the needle-changer by means of a pin 183 and its forward motion shall be limited in such a manner that the freshly introduced needle is not pushed beyond the correct normal position in the holder. On the slide 61' (i. e., on the pin 183) is mounted a pin 63, with which the needle-changer rod of the driving mechanism engages. Spiral springs 63', and 63², connected to the pin 183, tend to keep the slide 61' continuously in the position of rest shown in Fig. 29.

On the frame of the needle-changer is detachably mounted the needle-magazine 61 containing the needles 184. The slide-piece 62, which is movable on the needle-changer frame and which serves as a guide for the slide 61', receives in its slot 62' the needles 184 from the magazine 61 and holds them ready for the slide (Fig. 29). And by reason of the action of the spring 63', the slide-piece 62 is carried along by the pin 183, guided in a longitudinal slot 185 in the said slide-piece, until its adjustable screw-stop 186 (Fig. 18) abuts against the frame and prevents further motion of the slide-piece (Fig. 30). The slide-piece 62 is here conducted to the needle-holder 64, so that in the further motion of the slide 61' which is still unlimited, a fresh needle 184 can be introduced into one side of the longitudinal slot 181 of the needle-holder 64 and at the same time the previously used needle 187 pushed out.

The slide is limited in its forward motion by the pin 183 abutting against one end of the slot 185. The dimensions of the slot 185 are made such that pushing of the new needle beyond the normal position is prevented. The automatic return of the slide 61', and also of the slide-piece 62 is effected by the springs 63' and 63². It is necessary that the radial arm 139 with the sound-box arm 129 and the sound-box 65 be held locked from motion during the changing of the needles. This is effected by means of a locking device as hereinafter explained.

The various positions of the needle during the insertion and changing by means of the slide 61' are given in the diagrammatic views in Figs. 25 to 28 inclusive.

In the position shown in Fig. 25, which corresponds approximately to Fig. 30, a new needle 184 is in the slide-piece 62 of the needle-changer on the way to the needle-holder 64, while the previously used needle 187 is still in the clamping grooves 181' of the slot 181. The slide-piece 62 has reached its end position and the changing of the needle begins. Fig. 26 shows the position of the two needles directly before the changing; the slide 61': having already moved on and the needle 184 having entered one half of the slot 181, so that it touches the one previously used. If now, as shown in Fig. 27, the forward motion of the slide is continued, the new needle forces the previously used one 187 out of the clamping grooves 181' at the same time bending the spring 182 and enters at this place as shown in Fig. 28. The rounded spring 182 flying back into the position shown in Fig. 25, here causes the used needle 187 to be forcibly ejected from the slot 181. When this has taken place, the slide 61' and the slide-piece can return to their initial positions, as shown in Figs. 25 and 29.

The motion of the slide 61' in the direction of the arrow, Fig. 17, is effected by means of the rod 66 which is moved in a longitudinal direction by means of the cam-disk 54, Fig. 11.

The rod 66, it may be mentioned here, is provided with a rectilinear guide 72, which limits the motion of the rod in one direction by striking against a stop 73 mounted on the frame plate 58 and, by means of a guide-pin 74, prevents the rod 66 from turning, for which purpose the pin 74 may be guided in a recess in the stop 73. The rod 66 acts at its thickened end 75 against an adjustable striking-screw 76 on the two-armed lever 77, which lever is pivoted at 78 and the upper arm 79 thereof arranged to act on the head 63 of the needle-changer-slide. When the rod 66 is moved out of the position shown in full lines in Fig. 11 into that shown in dotted lines, the head 63 with the slide 61' is moved in such a manner that the injection of a new needle and the simultaneous ejection of the one previously used takes place, in which operation the action of the lever 77 can be regulated to a nicety by adjusting the striking-screw 76. The cam-disk 54 is so shaped that the rod 66 and the head 59 thereof return to their initial positions after the changing of the needles.

The rod 66 moving the needle-changer has fulfilled its task as regards the changing of the needles as soon as the cam-disk 54 has made one revolution. In order that there may not be a continuous reciprocation of this rod during the operation of the machine by reason of the continued rotation of the shaft 53 with the cam-disk 54, the driving of the shaft 53 must be interrupted. This is effected by uncoupling the driving wheel 52 from the main driving wheel 50 after the needle has been changed. For this purpose, the wheel 52 is mutilated and at one part of its periphery has a segment 80 throughout which the teeth are removed, which segment during the talking or playing lies opposite to the intermediate driving wheel 51. The construction and method of operation of this arrangement can be seen from Figs. 6 and 11 on the one hand, and also from the detail views, Figs. 19 to 22 inclusive. Fig. 19 shows the driving wheel 52 with the apparatus out of operation in position for commencing the next operation of the machine. After the setting in action of the motor 3, the driving wheels turn in the direction of the arrows, and the driving of the shaft 53 takes place directly after the driving mechanism is set in action.

On the driving wheel 52, there is provided a striking piece 82, as shown in Fig. 19. Moreover, in addition to the driving wheel, a locking device coacting with this striking piece is provided which locking device is alternately thrown into and out of action. The throwing out of action of said locking device is effected by means of the part 86 of the main rod to be hereinafter described. Shortly after the commencement of the operation, and after the driving wheel 52 has made the greater part of its revolution and the needle-changer has been set in motion, the stop 82 strikes against the locking piece 81 of the piece 84 (Fig. 22), which is capable of turning about the vertical shaft 83 and against the other end 85 of which the previously mentioned part 86 can act. By this locking device, the further motion of the driving wheel 52 is arrested, since at the same time the recessed part 80 has come in front of the intermediate wheel 51.

The driving-wheel 52 mounted on the shaft 53 is thus thrown out of gear with the wheel 51, in which position it remains during the whole operation of talking or playing. In order that the driving wheel 52 may be in the position shown in Fig. 19 ready to work at the beginning of the next operation of the machine, care must be taken that, on the completion of the talking or playing, on the one hand, the locking device 81, 82 is thrown out of action again, and on the other hand, the wheel 52 is turned so far that it is again in engagement with the intermediate wheel 51. This is effected in the form of construction shown, by means of a lever 87 which is also employed for other purposes as hereinafter described. This lever is drawn by means of a spring 88 in such a direction against a striking piece 89 on the driving wheel 52, that the spring-pressure tends to turn the driving wheel 52, in the direction of the arrow (Figs. 19 and 9). If, therefore, the locking device releases so that the locking piece 84 is turned about its axis 83 by pressure of the part 86 against the lower end 85, the spring 88 by means of the lever 87 effects the further motion and the reëngagement of the driving wheel 52 with the intermediate wheel 51. This takes place after completion of the talking or playing when the main rod is drawn back under the action of its driving crank in the manner hereinafter described.

After the swinging out of a disk-frame with its record-disk, there takes place simultaneously with the setting in action of the needle-changer, 4: *The raising of the turntable 4 for the purpose of lifting the record-disk 9 from its frame.*—After the setting in action of the driving-mechanism 3, in the first place the toothed wheel 50 acts on the previously described intermediate wheel 51. On the shaft 90 of this intermediate wheel is mounted a bevel wheel 91 which is continuously in engagement with a rotary bevel-pinion 92 arranged beneath the frame plate 58. This pinion 92 is itself combined with a gear wheel 93 which engages with the driving gear-wheel 94 (Figs. 3 and 11) of the governor 47 and drives the latter. The frame-plate 58 and the bevel-pinion 92 are provided with bushings to receive the turntable-shaft 95. The latter, the lower pivot 96 of which is supported on the main frame 97 (Figs. 4, 5, 6, 7 and 11), is provided with a longitudinal groove 98 (Fig. 11), which serves for the reception of a driving-pin 98' on the bevel-pinion 92. The turntable shaft 95 with the turntable 4 can therefore, by reason of the groove 98, be raised and lowered and at the same time continuously rotated, without the wheels 92 and 93 participating in such vertical motion. On the part of the shaft 95 above the frame-plate 58, there is rigidly mounted a gear-wheel 99 and above this, on the thickened part 100 of the shaft, the turntable 4 is mounted. On the frame-plate 58 itself is rotatably arranged a gear-wheel 101 (Figs. 2, 4 and 5), with which the wheel 99 comes into and out of engagement.

When the driving wheel 52 has completed the greater part of its revolution, the lever 87 is moved by the projection 89 on the wheel 52 in the direction of the arrow 102 (Figs. 6 and 9). In this movement, the lower suitably bent arm of the lever 87 strikes against a pin 103 on a gear-wheel 104 and turns the latter in such a manner that it comes into engagement with the gear-wheel 50 of the motor 3. This position is shown in Fig. 10. The gear-wheel 104 is arranged at the lower part of the main frame 97 on the shaft 103' and is provided with two gaps 104' and 104² in its teeth, of which 104' is on the gear-wheel 50 of the motor 3 in the position of rest. The gear-wheel 104 can accordingly begin its rotary motion after the lever 87 has struck against the pin 103. When this takes place, the following operations have already been performed. The governor 47 is unlocked, the frame 8 with its record-disk 9 is swung outwardly for talking or playing, a new needle is inserted by means of the needle-changer 61 into the sound-box 65, and the old needle is simultaneously removed.

In order to effect the raising and lowering of the turntable 4 by the motion of the gear-wheel 104, a crank 105 (Figs. 3, 4 and 6) is arranged on the shaft 103' on the opposite side of the main frame 97, the connecting rod 106 of which crank engages by means of a slot-guide 107 with the above mentioned main rod 108. The main rod bears on its middle part a rigid projection 109 (Figs. 4 and 5). By the rotation of the wheel 104 and the crank-gearing 105 and 106 in the direction of the arrow 110 (Fig. 3), which takes place after the throwing into coöperation the gear-wheel 104 with the gear-wheel 50, the main rod 108 is pressed by means of its projection 109 against a striking piece 111 in such a manner that the latter is carried along as far as is allowed by the crank gear-wheel 104. As soon as the gap 104² on the gear-wheel 104 reaches the gear-wheel 50, the said gear-wheel 104 is thrown out of action, so that the main rod 108 temporarily remains in the end position shown in Fig. 5.

Between the upper and lower parts of the frame 97, a plate 112 is arranged beneath the turntable-shaft 95 (Figs. 4 and 5). On this plate, there is mounted a one-armed lever 114 capable of swinging about the pivot 113, on which lever 114 a second double-armed lever 115 is capable of oscillating. One arm of the latter is connected to a rod 118 which is capable of moving vertically and is guided by means of a pin 116 in a guide 117 in the plate 112. This rod 118 carries on its upper end a head 119 extending into a recess in the upper part of the main frame 97, on which head, preferably in a recess therein, is mounted the above-mentioned pivot 96 of the turntable shaft 95. To the lower arm of the double lever 115 is coupled a single-armed laterally movable lever 134 which, in the same manner as the double lever 115, is pivotally connected by means of a pin 119' with a rod 121 which is movable laterally in a horizontal guide 120 in the plate 112. This rod 121 is guided in the projection 109 secured to the main rod 108 and carries at its end the above mentioned striking piece 111. If, therefore, during the movement of the main rod 108 in the direction of the arrow 110 (Fig. 3), the projection 109 reaches the striking piece 111, the horizontal rod 121 is carried along with it in the same direction and the lever 114 turned about its fulcrum 113 in such a manner that the double lever 115 is likewise turned and the vertical rod 118 is raised in the guide 117. The turntable-shaft 95, mounted on the head 119 and capable of sliding in the bevel-pinion 92, is carried up in this motion so that its gear-wheel 99 is brought out of engagement with the gear-wheel 101 and the record-disk 9 lying on an outwardly swung frame 8 is removed by the turntable 4 from its frame. During this operation and directly following it, takes place 5. *The depression of the sound-box which is in the raised position while the talking machine is inoperative.*—This is effected during the movement of the main rod 108, for which purpose the said rod is provided at the opposite end to the crank with a slide block 122 on the upper surface of which rests a second slide-block 123 when in the inoperative position (Figs. 3, 6 and 7). Both blocks are provided with inclined co-acting slide surfaces 124. The upper slide-block 123 is connected to a shaft 125 which is guided vertically in bearings, and bears a transverse roller 126 supported in fork-shaped bearings (Figs. 3, 8 and 11). When the lower slide-block 122 takes up its outermost position after the movement of the main rod 108, the upper-slide-block 123 in the meantime has descended, by reason of its weight on the inclined surface 124 of the slide-block 122.

On the slide block 122 is mounted a horizontal arm 127, bent at right angles to said block (Figs. 1, 3 and 4). This arm coacts with a pin 128 hereinafter described, in such a manner as to cause the depression of the sound-box 65 on to the record-disk 9. The sound-box-arm 129 is for this purpose provided, on the joint-piece 129′, connected to the radial arm 139, with a pin 130 (Figs. 3, 4, 17 and 18), which, when the sound-box is raised, is turned perpendicularly downward (Figs. 3, 4, 17 and 18). An adjustable screw stop 188 on an arm 189, fixed to the radial arm 139, serves as a support for the raised sound-box arm 129.

On the cover 97′ at the sound-box side, there is arranged a bushing 131, through which a rotary shaft 132 extends downward to the arm 127, while on the lower end of the shaft 132 there is fixed an arm 133, the pin 128 of which is drawn against the arm 127 by means of a tension spring 135. A lever 138 rigidly attached to the shaft 132 and arranged above the bushing 131 controls the descent of the sound-box-arm 129 with the sound-box 65 (Figs. 3, 4, 17 and 18). This takes place with the movement of the main rod 108 in the direction of the arrow 110. In this motion, the arm 127 on the lower slide-block 122 is moved along with the rod 108 and pressed against the pin 128 on the arm 133, so that the arm 133 is carried with it. This occurs at the same time the shaft 132, rigidly connected to the arm 133 is turned in its bushing 131, so that the lever 138 presses against the pin 130 on the sound-box-arm 129 in the direction of the arrow (Figs. 3 and 4) and thereby initiates the descent of the sound-box.

The further downward motion of the sound-box is effected by the action of gravity thereon, but a too rapid descent of the sound-box and consequent damage to the record disk by the needle is prevented in that the transverse roller 126, which is mounted on the shaft 125, connected to the upper slide-block 123, and which sinks slowly in the manner hereinbefore described, permits only a gradual descent of the sound-box-arm. For this purpose, a lever 175 pivotally mounted upon the shaft 176 on the radial arm 139 is pivotally connected by a link 175′ to the joint 129′ of the sound-box-arm. The shaft 176, pivotally mounted on the radial arm 139 of the lever 175, carries one end of a second lever 177 which moves on the other side of the radial arm. The free end of this lever 177 is pivotally attached by means of a link to a roller-frame 178, which is capable of turning about a pivot 179 on the radial arm 139. The roller 178′ in the frame 178 rests continuously on the transverse roller 126 of the shaft 125, so that the depression of the sound-box-arm can only take place gradually to correspond with the descent of the transverse roller 126.

6. The release of the radial arm, which is held locked in the inoperative position of the machine and during the changing of the needle, is effected while the sound-box 65 descends. The locking of the radial arm 139 is effected by means of a locking hook 136, which, in the raised position of the sound-box, engages the pin 130, arranged on the joint 129′ of the sound-box-arm. The locking arm 136 is capable of turning freely on the bushing 131 about the shaft 132, in which movement, a spring 13., fixed to the bushing 131, provides for the engagement of the arm or hook 136 with the pin 130. If, therefore, the sound-box descends, the pin 130 comes out of range of the locking arm 136 and the way is made clear for a lateral motion of the radial arm 139. The sound-box 65 with the needle is now on the record-disk 9 and the operation proper, i. e., the talking or playing, begins.

7. During the talking or playing, the position of the separate parts is as follows:— The main rod 108 with the coin-pocket 41 is pressed into the outermost position (in the direction of the arrow, Fig. 4) and the shaft 125, carrying the upper slide-block 123 and the transverse roller 126, has descended to its lowermost position. The crank-gear-wheel 104 stands with its recess 104² opposite to the gear-wheel 50 of the motor 3. The crank 105 and the connecting rod 106 coupled thereto are approximately in their extended positions (Fig. 5), and the projection 111 on the raising and lowering device for the turntable 4 lies on the projection 109 on the rod 108.

The levers 114 and 115 together with the push-rod 118, have completed their upward motion to its extreme limit and have thereby brought the turntable 4 into its highest position. The gear-wheel 52 lies with its gap 80 on the intermediate wheel 51. The double-armed lever 84—85, which is capable of turning about the vertical shaft 83, has its locking piece 81 on the locking projection 82 of the driving wheel 52 and locks the latter, while the downwardly bent arm 85 is released by the projection 86 on the main rod 108. The second striking piece 89 on the driving wheel 52 stands above the shaft 53, in which arrangement the lever 87 is drawn against the hub of the driving wheel 52 without touching the projection 89 (Fig. 19). The lower downwardly bent arm of this lever 87 is removed from the striking pin 103 of the gear wheel 104.

The lever 134 with the push-rod 121, during the talking or playing, takes up the extreme lateral position. After one revolution of the cam-disk 54, during which the changing of the needle has taken place, the disk again takes up its initial position shown in Fig. 11, so that, by reason of the simultaneous return of the lever 77—79, the slide 61' and the slide-piece 62 of the needle-changer can be drawn back into their initial position (Fig. 29) under the action of their springs 63' and 63². The outwardly swung disk frame 8, during the operation of playing or talking, lies encircling the turntable 4 carrying the record-disk 9, and is thus prevented from returning.

The above-mentioned gear-wheel 101 rotatably mounted on the frame-plate 58 has its toothless gap in the position opposite to that shown in Fig. 2, or, in other words the gap lies during the talking or playing, beneath the gear-wheel 99 of the raised turntable shaft 95. At the end of the talking or playing, there takes place 8. *The automatic return of the radial arm with the sound-box-arm into the inoperative position.*—This is effected by means of a releasing device which can be of any desired kind. That employed in the example illustrated is shown in its relation to the general arrangement in Fig. 2, and its detailed construction can be seen from Figs. 6 and 7. The return motion itself is initiated by the positive guiding of the sound-box-needle in the sound-wave groove of the record-disk at the end of the talking or playing. In this operation, the radial arm 139 strikes against a lever-arm 141, rigidly attached to a vertically mounted releasing shaft 140. This shaft 140, which is mounted in a second outer shaft 142, is provided at the lower end with a pin 143 (Figs. 6 and 7), which engages in a piece 145 on a horizontal rod 144, capable of swinging laterally thereto on the frame 97 (Figs. 3, 4, 6 and 7). Therefore, as soon as the radial arm 139 abuts against the short lever-arm 141 and carries the latter with it, at the same time turning the inner shaft 140, the rod 144, as can be seen from Fig. 7, is swung in the direction of the arrow 146 by means of the piece 145. The rod 144 is connected at the other end by means of a guide-slot with a pin 147 which extends through the frame 97 and is provided with a head at each end (Figs. 6 and 7). This pin 147 (which is shown in dotted lines in Fig. 7 in the inoperative position of the apparatus and which in the operative position, when the crank is in the opposite position to Fig. 7, viz., in Fig. 5, arrests the motion of the main rod 108 by extending into the path of the crank 105) is drawn away by the above-described swinging of the rod 144 from beneath the crank 105. This crank 105, which is now free, falls by its own weight through such a distance that the gear-wheel 104 again comes into engagement with the gear-wheel 50 of the motor 3 which is in operation. The crank 105 and connecting-rod 106 now perform the second part of their respective motions in order to return the main rod 108 to its initial position. Before the radial sound conveying arm 139 is returned to its initial position, the sound-box-arm with the sound-box must obviously be raised from the record-disk. This takes place during the return motion of the main rod 108, for which purpose the slide-block 122 returning with the main rod 108, by means of its inclined surface 124, pushes the upper slide-block 123 with the shaft 125 up again. By this means, the transverse roller 126 on the shaft 125 is pressed against the roller 178' on the roller frame 178, so that the sound-box-arm 129 is oscillated upwardly about its joint 129' against the stop 188 by means of the levers 175 and 177. The lower slide-block 122 bears a guide-fork 149 for a bent arm 150 which is mounted on a ring 151 at the lower end of the outer shaft 142 (Figs. 6 and 7). The arm 150 is provided with a spiral spring 154 engaging with the projection 86 on the main rod 108, which spring continually tends to draw the arm 150 and therewith the shaft 142 in the direction of the arrow 170 (Fig. 7). Thus, free turning of the releasing shafts 140 and 142, and also of the parts connected therewith, is prevented (Figs. 3 and 4). The tension-spring 154 also effects the return motion of the radial arm 139 into the inoperative position, and for this purpose, the outer shaft 142 at its upper end bears a lever arm 153 having a striking piece 155 (Figs. 1, 2, 6 and 7). If now, during the return of the main rod 108 with the lower slide-block 122, the arm 150 and therewith the outer shaft 142 are turned by the tension spring 154 in the direction of the arrow 170, Fig. 7, the lever 153 carried along therewith, by means of its striking pin 155, effects the return of the radial arm 139 into the inoperative position in the direction of the arrow 164 (Fig. 2). The levers 153 and 141 remain in the position shown in Fig. 7, up to the beginning of the next operation, at which time they are turned by the radial arm into the positions shown in dotted lines in order afterward to turn back in the manner hereinbefore described at the completion of the talking or playing, at the same time bringing back the radial arm to the initial position.

9. The descent of the turntable and deposition of the record-disk on to a disk-frame also take place after the completion of the talking or playing, during the return of the main rod 108 and the radial arm 139 to their initial positions. In this operation, the projection 86 on the main rod 108 carries with it the projection 111 and thereby effects the return of the rod 121. This has for its result the drawing downwardly of the push-rod 118 in the guides 117 into the inoperative position by means of levers 114, 115 and 134. During the descent of the push-rod 118, there also takes place the descent of the turntable and at the same time the deposition of the record-disk 9 on to the frame 8 surrounding the turntable 4.

10. The swinging back of the disk-frame with the used record-disk into the storage-receptacle follows directly upon the descent of the turntable. By the descent of the turntable-shaft 95, its gear-wheel 99 is brought into the same plane as the gear-wheel 101, pivotally mounted on the frame plate 58. Since however the gear-wheel 101 at the completion of the talking or playing has its toothless gap opposite the gear-wheel 99, the engagement of the pinion 99 with the teeth of the wheel 101 is prevented. Thus, engagement must take place between the gear-wheel 99 and the gear-wheel 101 in order to cause a movement of the latter. In this connection it may be remarked that, by the turning of the outer releasing shaft 142 into the initial position, the hooked shaped end of a spring arm 157 (Fig. 2), connected to this shaft by a pivotal joint 156, comes into engagement with a pin 158, arranged on the lower side of the gear-wheel 101, and throws the wheel 101 into gear with the pinion 99. The direction of rotation of the gear-wheel is indicated by arrows in Fig. 2. The second part of the rotation of the gear-wheel 101 now takes place. On the frame-plate 58 near the gear-wheel 101 is arranged a lever 159 which bears a contact-roller 160 at its free end, while on the gear-wheel 101 there is, moreover, secured a striking pin 161 in such a manner (Figs. 2 and 6) that, in the second half of the rotation of the gear-wheel 101, it abuts against the lever 159 and causes it to oscillate. This has for its result that the lever 159, by means of its contact-roller 160, presses against the previously described cam shaped recess 30 in the disk-frame 8 and returns the latter with the record-disk 9 into the inoperative position, as shown in Fig. 16. A spring 159' arranged beneath the lever 159 provides for the return thereof to its original position. The gear-wheel 101 is in the position shown in Fig. 2 after the swinging back of the frame. After the descent of the turntable and the swinging back of the disk-frame there takes place.

11. *The stoppage of the motor and the return of the coin-release device to its position of rest.*—The projection 86 on the rod 108 carries on its surface a rod 163 (Fig. 4 and Figs. 19 to 22 inclusive) which is pivotally-mounted in a fork and the front part of which, by means of a tension-spring 165 fixed to the projection 86, lies on a sliding and striking piece 166 fixed to the coin-release rod 43. The striking-piece 166, Figs. 4 and 7, is provided with a recess bounded by two striking surfaces, in which rests the front part of the rod 163. During the return of the main rod 108, the striking piece 166 is accordingly carried along by means of the rod 163, so as to bring the coin-release rod 42, 43 and the coin-pocket 41 into their normal position of rest. The coin-pocket 41 now stands again under the coin-chute, so that a coin inserted through the chute can pass into the coin-pocket 41; in any other position, coins introduced are conducted past the pocket. In the return motion of the coin-release rod 42—43, the stop 46, also fixed to this rod, is brought into the path of the governor 47 and thereby the said governor is thrown out of action together with the motor 3.

12. The locking of the record-disk changer during the talking or playing is effected in the manner shown in Figs. 2, 3, and 13. By the movement of the coin-release rod 42 43 and of the coin-pocket 41, a lever 167, which is pivotally mounted on the frame-plate 58 and coupled to the coin-release device, is moved in the direction of the arrow 168 (Fig. 2), while at the other end, the lever 167 is loosely connected to the above mentioned locking pin 26. The latter is guided in a guide-piece 169 on the disk-changing frame in such a manner that, upon the release of the driving gear and by reason of the motion of the coin-releasing device connected therewith, it enters into the catch 25, corresponding to the position of the record-disk 9 in the locking disk 24. By this means, any turning of the disk-setting handle 16 or alteration of its position on the indicator disk 21 is prevented during talking or playing. The disk-changer is released by the automatic return of the coin-releasing device into its normal position of rest.

The invention can obviously be modified in its constructive details. Thus, any desired form of motor 3 can be employed, as already mentioned. The needle-changer can be constructed in such a manner that the insertion of the new needle and the removal of the one previously used are not effected simultaneously and by one device, as for example two separate devices might be employed, one of which provides for the insertion and the other for the ejection of the needle. The needle-holder does not require to be provided with a longitudinal slot extending through it, it simply being sufficient to provide an inlet-slot for the needle, arranged on one side only of the needle-seat. The ejection of the used needle would then obviously take place before the insertion of a new needle. The record-disk changing device can also be provided with separate driving mechanism, which would be thrown into and out of action in a suitable manner by the main driving mechanism.

The construction of the disk-frames themselves can be varied as desired, except that, when employing a rising turntable, it must always be taken into consideration that the turntable shall be able to take up the record-disks and put them down again after completion of the talking or playing. The disk-changer can also be arranged in such a manner that the raising of the turntable is dispensed with, the record-disks from the suitably - constructed changing - device being placed on an ordinary record-disk table, i. e., one not movable into an elevated position and again removed therefrom after the talking or playing is completed. It is essential in any case that the record-disks shall be capable of being selected and adjusted as desired and that, after the release of the driving-mechanism, and after the record-disk has been selected, all motions of the talking machine up to the stoppage of the motor shall take place automatically upon the completion of the talking or playing. The word "record-disk" as used herein and in the subjoined claims should be understood as including any suitable form of plate or tablet for supporting a sound-record.

What I claim and desire to protect by Letters Patent of the United States is:—

1. In a talking machine, the combination with a turn table and driving mechanism, of a pivoted record carrier and support, means actuated by the driving mechanism for swinging said carrier and support in a horizontal plane into and out of position over said turn table, and means for moving said table to remove a record from said carrier.

2. In a talking machine, the combination with driving mechanism, of a sound box and needle changing mechanism, a storage receptacle for record disks, a carrier device for record disks, said carrier device being supported in said receptacle, means actuated by said driving mechanism to swing said carrier device, and means actuated by the swinging movement of said carrier device to actuate said needle changing mechanism.

3. In a talking machine, the combination with a movable supporting frame, of rods for guiding said frame upon which said frame is slidably mounted, a pivot shaft on said supporting frame, carrier frames for records pivotally mounted upon said pivot shaft, driving mechanism and means actuated by said driving mechanism to swing said carrier frames.

4. In a talking machine, the combination with a vertically movable supporting frame, of rods guiding said frame, carrier frames for record disks mounted to oscillate in horizontal planes upon said supporting frame, and means for adjusting the position of said supporting frame.

5. In a talking machine, the combination with a vertically movable supporting frame, of rods for guiding said frame, carrier frames for record disks mounted one above the other upon said supporting frame, a rack and a gear for the vertical adjustment of said supporting frame, a pivot shaft on said supporting frame upon which said carrier frames are mounted to swing, driving mechanism, and means actuated by said mechanism for swinging said carrier frames.

6. In a talking machine, the combination with a vertically movable supporting frame, of rods for guiding said frame, carrier frames for record disks mounted one above the other in said supporting frame, a rack and a gear wheel for adjusting said supporting frame, an indicating device for adjusting the supporting frame in a predetermined position, a shaft on the supporting frame, said carrier frames being mounted to oscillate upon said shaft, driving mechanism and means actuated by said driving mechanism for swinging said carrier frames.

7. In a talking machine, a movable supporting frame, carrier frames mounted to swing on said supporting frame, means for the manual adjustment of said supporting frame in a predetermined position, driving mechanism, a brake for said driving mechanism, and a locking piece automatically actuated to lock said adjusting means during the operation of sound reproduction.

8. A talking machine comprising driving mechanism, annular record frames mounted to oscillate, each of said record frames being provided with a projection and a cam shaped surface on opposite sides respectively of the axis of oscillation of the said frame, and means actuated by said driving mechanism engaging alternately with one of said projections and one of said cam shaped surfaces to swing one of said frames into and out of position.

9. A talking machine comprising a turn table, driving mechanism, carrier frames for records mounted to swing about an axis, means between said driving mechanism and said frames to swing said carrier frames over said turn table, means actuated by said driving mechanism for raising said turn table after one of said carrier frames has been thrown into operative position over said turn table, for the purpose of lifting a record from said carrier frame, and means actuated by said driving mechanism for lowering the turn table to redeposit the record on the carrier frame.

10. A talking machine comprising a turn table, driving mechanism, carrier frames for records mounted to oscillate, means actuated by said driving mechanism to oscillate said carrier frames, a driving shaft for said turn table, levers oscillated by said driving mechanism and positively connected to the said turn table shaft for raising the turn table to remove a record from one of said carrier frames, and to lower said turn table to redeposit the said record on the said carrier frame.

11. A talking machine comprising a turn table, driving mechanism, carrier frames for records mounted to oscillate over said turn table and actuated by said driving mechanism, a driving shaft for said turn table actuated by said mechanism, a toggle connected at one end to said driving shaft, guides for said toggle, a link connected to the said toggle, and means actuated by said driving mechanism for reciprocating said link for the purpose of raising and lowering said turn table to remove and to redeposit a record on one of said carrier frames.

12. A talking machine comprising driving mechanism, carrier frames for records mounted to oscillate, means actuated by said driving mechanism for oscillating said frames, a sound box, and needle changing mechanism for said sound box actuated by said driving mechanism for automatically inserting a new needle laterally into said sound box and for simultaneously ejecting a used one therefrom.

13. A talking machine comprising driving mechanism, carrier frames for record disks mounted to oscillate and actuated by said driving mechanism, a needle holder, a needle changing device comprising a spring slide for pushing a new needle laterally into the said needle holder and simultaneously ejecting one therefrom, a shaft actuated by said driving mechanism, a cam disk on said shaft, a longitudinally movable rod actuated by said cam disk, and a lever mounted to oscillate and actuated by said longitudinally movable rod to move the said slide of the said needle changing device.

14. A talking machine comprising sound reproducing mechanism, driving mechanism therefor, carrier frames for records mounted to oscillate, a sound box and needle holder, a device for inserting a needle into the needle holder and simultaneously ejecting one therefrom, a rod actuated by said driving mechanism for setting the needle changer into operation, and a toothed driving wheel provided with a gap in its teeth for actuating said rod whereby said needle changing mechanism remains at rest during the reproduction of sound.

15. A talking machine comprising driving mechanism, a carrier frame for a record mounted to oscillate and actuated by said driving mechanism, a sound box and needle holder, a needle changing device comprising a spring slide for pushing a needle into the needle holder and simultaneously ejecting one therefrom, a shaft actuated by the driving mechanism, a cam disk on said shaft, a rod mounted to be moved longitudinally by said cam disk, a lever mounted to swing about an axis and oscillated by said longitudinally movable rod, said lever actuating said slide of the needle changing device, and an adjusting screw mounted on said lever and engaging against the said rod for adjusting the amount of oscillation of said lever as desired.

16. A talking machine comprising driving mechanism, a carrier device for records mounted to oscillate and actuated by said driving mechanism, a radial arm, a sound box mounted upon said arm, a needle holder on said sound box, needle changing mechanism actuated by said driving mechanism, and a locking device for the radial arm connected to the sound box for securing the radial arm during the changing of needles.

17. In a talking machine, the combination with a rotatable record support and driving mechanism therefor, of a pivoted record carrier mounted to swing into and out of alinement with said record support and operatively connected to said driving mechanism, and means to move said support to remove a record from said carrier.

18. In a talking machine the combination with a substantially flat rotatable record support and driving mechanism therefor, of a record supporting carrier pivoted to swing in a plane parallel to said support and actuated by said driving mechanism.

19. In a talking machine, the combination with a rotatable record support and driving mechanism therefor, of an annular record carrier pivoted to swing into and out of axial alinement with said record support.

20. In a talking machine the combination with a rotatable record support, and driving mechanism therefor, of an annular record carrier pivoted to swing into and out of axial alinement with said record support and actuated by said driving mechanism.

21. In a talking machine, the combination with a rotatable record support, of a plurality of movable record carriers, and means for moving any one of said carriers into and out of vertical alinement with said record support.

22. In a talking machine the combination with a rotatable record support, of a plurality of movable record carriers arranged in vertical series adjacent said support, and means for moving any one of said carriers into and out of vertical alinement with said record support.

23. In a talking machine, the combination with a rotatable record support, of a plurality of pivoted record carriers, and means for moving any one of said carriers into and out of vertical alinement with said record support.

24. In a talking machine, the combination with a rotatable record support, of a plurality of pivoted carriers arranged in vertical series, and means for moving any one of said carriers into and out of vertical alinement with said record support.

25. In a talking machine the combination with a substantially horizontal record turn table, of a plurality of pivoted record carriers arranged in vertical series adjacent said turn table, means to move said carriers vertically, and means to swing one of said carriers over said turn table.

26. In a talking machine the combination with a substantially horizontal record turn table, and driving mechanism therefor, of a plurality of pivoted record carriers arranged in substantially vertical series adjacent said turn table, means to move said carriers vertically and means actuated by said driving mechanism to swing one of said carriers over the turn table.

27. In a talking machine the combination with a plurality of movable record carriers pivoted to swing horizontally, of an index and circular index plate for adjusting said carriers vertically in a predetermined position, driving mechanism, a brake for said driving mechanism, and means actuated by the release of said brake to lock said index.

28. In a talking machine the combination with a movable record carrier, means to move said carrier, a laterally movable needle holder, and a fixed needle changing mechanism operatively connected to said moving means.

29. In a talking machine the combination with a movable supporting frame, a shaft on said frame, annular record carriers pivotally mounted on said shaft, driving mechanism and means actuated by said driving mechanism to swing one of said record carriers about its pivot.

30. In a talking machine the combination with a movable supporting frame, record carriers carried by said frame, means for adjusting the position of said supporting frame, driving mechanism, and means actuated by the release of said driving mechanism for locking said frame.

31. In a talking machine, the combination with a vertically movable talking machine record supporting frame, of a vertical shaft carried by said frame, and carrier frames for removably supporting talking machine records pivoted in vertical series upon said shaft.

32. In a talking machine, the combination with a vertically movable supporting frame, of a vertical shaft carried by said frame, carrier frames for records pivoted in vertical series upon said shaft, driving mechanism, and means actuated by said driving mechanism for swinging said frames.

33. A talking machine comprising driving mechanism, a pivoted record frame, and two members actuated by said mechanism and engaging said frame alternately to swing said frame in opposite directions.

34. A talking machine comprising driving mechanism, a pivoted record frame and two members actuated by said mechanism and engaging said frame alternately upon opposite sides respectively of the axis of oscillation of said frame to swing said frame in opposite directions.

35. A talking machine comprising driving mechanism, a pivoted record frame provided with a projection and a recess upon opposite sides respectively of the axis of oscillation thereof, and two members actuated by said mechanism and engaging said projection and said recess respectively to swing said frame in opposite directions.

36. A talking machine comprising a vertically movable turn table, a record carrier movable over said turn table, means for raising said turn table after said carrier frame has been moved into operative position over said turn table, to lift a record from said frame, and means for lowering the turn table to redeposit the record on the said carrier frame.

37. A talking machine comprising a vertically movable turn table, driving mechanism therefor, a record carrier movable over said turn table, means actuated by said driving mechanism for raising said turn table after said carrier frame has been moved into operative position over said turn table, to lift a record from said frame, and means actuated by said driving mechanism for lowering the turn table to redeposit the record on said carrier frame.

38. A talking machine comprising driving mechanism therefor, a needle holder and needle changing mechanism comprising a spring slide actuated by said driving mechanism for pushing the needle laterally into the said needle holder and simultaneously ejecting one therefrom.

39. A talking machine comprising a turn table, and driving mechanism therefor, a radial arm mounted to swing over said turn table, a sound box pivoted to said arm, and means actuated by said driving mechanism for swinging said sound box away from said turn table and into an inverted position.

40. A talking machine comprising a turn table and driving mechanism therefor, a radial arm mounted to swing over said turn table, a sound box pivoted to said arm, means actuated by said driving mechanism for swinging said sound box away from said turn table and into an inverted position, and means actuated by said driving mechanism for returning said sound box toward said turn table.

41. A talking machine comprising a turn table, and driving mechanism therefor, a radial arm mounted to swing over said turn table, a sound box pivoted to said arm, means actuated by said driving mechanism for swinging said sound box away from said turn table and into an inverted position, means actuated by said driving mechanism for returning said sound box toward said turn table, and needle changing mechanism arranged to be in operative position when said sound box is in its inverted position.

42. A talking machine comprising a turn table and driving mechanism therefor, a radial arm mounted to swing over said turn table, a sound box pivoted to said arm, means actuated by said driving mechanism for swinging said sound box away from said turn table and into an inverted position, means actuated by said driving mechanism for returning said sound box toward said turn table, and means for locking said sound box when in its inverted position.

43. A talking machine comprising a turn table and driving mechanism therefor, a radial arm mounted to swing over said turn table, a sound box pivoted to said arm, means actuated by said driving mechanism for swinging said sound box away from said turn table and into an inverted position, means actuated by said driving mechanism for returning said sound box toward said turn table, needle changing mechanism arranged to be in operative position when said sound box is in its inverted position, means for locking said sound box when in its inverted position, and means actuated by the downward movement of said sound box for releasing the same from said locking means.

44. A talking machine comprising a turn table and driving mechanism therefor, a radial arm mounted to swing over said turn table, a sound box carried by said arm, needle changing mechanism, means actuated by said driving mechanism for bringing said sound box into operative position with respect to said needle changing mechanism, means for automatically locking said sound box in said operative position, means between said needle changing mechanism and said driving mechanism whereby said needle changing mechanism is caused to operate when said sound box is in its locked position, and means actuated by said driving mechanism for releasing said sound box from locked engagement after said needle changing mechanism has been operated, and to bring said sound box into operative position with respect to said turn table for the reproduction of sound.

45. In a talking machine, the combination with a turntable and driving mechanism therefor, of a pivoted record carrier, a record upon said carrier, means actuated by the driving mechanism for swinging said carrier and record in unison, and means for moving said turntable to remove the record from the carrier.

46. In a talking machine, a vertically movable supporting frame, carrier frames for records mounted to swing horizontally on said supporting frame, means for the adjustment of said supporting frame vertically, driving mechanism, and a locking piece actuated by the release of said driving mechanism for locking said adjusting means during the operation of sound reproducing.

47. A talking machine comprising driving mechanism, a sound box, and needle changing mechanism for said sound box actuated by said driving mechanism for automatically inserting a needle laterally into said sound box.

48. A talking machine comprising driving mechanism, a sound box, and needle changing mechanism for said sound box actuated by said driving mechanism for automatically inserting a needle laterally into said sound box, and for simultaneously ejecting one therefrom.

49. A talking machine comprising driving mechanism, a needle holder, a needle changing device comprising a slide for pushing a needle laterally into the said needle holder and simultaneously ejecting one therefrom, a shaft actuated by said driving mechanism, a cam disk on said shaft, a longitudinally movable rod actuated by said cam disk, and a lever mounted to oscillate and actuated by said longitudinally movable rod to move the said slide of the said needle changing device.

50. In a talking machine, the combination with a rotatable record support and driving mechanism therefor, of a pivoted annular record carrier mounted to be swung into and out of alinement with said record support by said driving mechanism.

51. In a talking machine, the combination with a rotatable turntable and driving mechanism therefor, of an annular pivoted record carrier mounted to swing into and out of axial alinement with the said turntable, and means actuated by said driving mechanism for swinging said carrier.

52. In a talking machine, the combination with a substantially flat rotatable turntable and driving mechanism therefor, of an annular record carrier pivoted to swing in a plane substantially parallel with a plane of said turntable, and means actuated by said driving mechanism to swing said carrier.

53. In a talking machine, the combination with a rotatable turn table, of a plurality of movable record carriers, and means for moving any one of said carriers into and out of axial alinement with said turntable.

54. In a talking machine, the combination with a rotatable record support, of a plurality of movable record carriers arranged in vertical series adjacent said support, and means for moving any one of said carriers independently of the remaining carriers into and out of a predetermined position with respect to said support.

55. In a talking machine, the combination with a rotatable record support, of a plurality of record carriers, and means for moving any one of said carriers into and out of a predetermined position above said support.

56. In a talking machine, the combination with a turntable, of a plurality of pivoted record carriers arranged in vertical series adjacent to said turntable, means to move said carriers vertically in unison, and means to swing any one of said carriers upon its pivot.

57. In a talking machine, the combination with a turntable and driving mechanism therefor, of a plurality of pivoted record carriers arranged in substantially vertical series adjacent said turntable, means to move said carriers vertically in unison, and means actuated by said driving mechanism to swing any one of said carriers upon its pivot.

58. In a talking machine, the combination with a record support, of a vertically movable vertical shaft, record carriers pivotally mounted on said shaft, driving mechanism, and means actuated by said driving mechanism to swing any one of said carriers about said shaft.

59. In a talking machine, the combination with a longitudinally movable shaft, of annular record carriers mounted to oscillate on said shaft, driving mechanism, and means actuated by said driving mechanism to swing any one of said carriers about said shaft.

60. In a talking machine, the combination with a record support, of a vertically movable supporting frame, record carriers each adapted to form the sole support for a record, and pivoted to said frame to swing horizontally, and means for adjusting the vertical position of said frame.

61. In a talking machine, the combination with a record support and driving mechanism therefor, of a record carrier, and means actuated by said driving mechanism for moving said support to remove a record from said carrier.

62. In a talking machine, the combination with a record support and driving mechanism therefor, of a record carrier and means actuated by said driving mechanism for moving said support to deposit a record upon said carrier.

63. In a talking machine, the combination with a record support and driving mechanism therefor, of a record carrier, and means actuated by said driving mechanism for moving said support to remove a record from said carrier and to re-deposit the same thereon.

64. In a talking machine, the combination with a record support, and driving mechanism therefor, of an annular record carrier, and means actuated by the driving mechanism for moving said support to remove a record from said carrier.

65. In a talking machine, the combination with a record support and driving mechanism therefor, of a record carrier actuated by said driving mechanism to move into and out of alinement with said record support, and means actuated by said driving mechanism for moving said support to remove a record from said carrier.

66. In a talking machine, the combination with a record support and driving mechanism therefor, of a record carrier actuated by said driving mechanism to move into and out of alinement with the said support, and means actuated by said driving mechanism for moving said support to deposit a record upon said carrier.

67. In a talking machine, the combination with driving mechanism, of a radial arm, a sound box mounted upon said arm, a needle holder on said box and needle changing mechanism actuated by said driving mechanism to insert a needle laterally into said holder.

68. In a talking machine, the combination with a record support and driving mechanism therefor, of a radial arm mounted to swing over said record support, a sound box mounted upon said arm, means actuated by said driving mechanism for swinging said sound box away from said support and into an inverted position, and means for automatically locking said sound box when in its inverted position.

69. In a talking machine, the combination with a record support and driving mechanism therefor, of a radial arm mounted to swing over said record support in a fixed plane, a sound box mounted upon said arm, means actuated by said driving mechanism for swinging said sound box away from said support and into an invertetd position, and means for automatically locking said sound box when in its inverted position.

70. In a talking machine, the combination with a radial arm, of a sound box pivoted to said arm to be swung into an inverted position thereon, and means for automatically locking said sound box when in its inverted position.

71. In a talking machine, the combination with a record support, of a radial arm mounted to swing over said support, a sound box mounted upon said arm to swing toward and away from said support, and means actuated by the movement of said box away from said support to lock said radial arm in a fixed position.

72. In a talking machine, the combination with a record support, of a radial arm mounted to swing over said support in a fixed plane, a sound box mounted upon said arm to swing toward and away from said support, and means actuated by the movement of said box away from said support to lock said radial arm in a fixed position.

73. In a talking machine, the combination with a record support, of a radial arm mounted to swing over said support, a sound box mounted upon said arm to swing toward and away from said support, and means actuated by the movement of said box away from said support to lock said radial arm in a fixed position, said arm being released from locking engagement by the opposite movement of said box.

74. In a talking machine, the combination with a record support and driving mechanism therefor, of a radial arm, a sound box mounted upon said arm to swing toward and away from said support, means actuated by said driving mechanism for swinging said box away from said support, and means actuated by the movement of said sound box away from said support for automatically locking the same, said means comprising a member carried by said sound box and a member yieldingly mounted upon a fixed support.

75. In a talking machine, the combination with a radial arm restrained to swing in a fixed plane for carrying a stylus needle, of a locking device for said radial arm, comprising a member carried by said arm, and a member mounted upon a fixed support, one of said members being yielding.

76. In a talking machine, the combination with a record support, of driving mechanism, a needle holder, needle changing mechanism, a movable record carrier, and means actuated by said driving mechanism for simultaneously moving said carrier toward said support and for actuating said needle changing mechanism.

77. In a talking machine, the combination with a record support, of a record carrier comprising a frame having an opening adapted to receive said support, said frame being mounted to swing into and out of alinement with said support.

78. In a talking machine, the combination with a record support, of a record carrier comprising a frame having an opening adapted to receive said support, said frame being mounted to swing into and out of alinement with said support, and means to cause said support to pass into said opening.

79. In a talking machine, the combination with a record support, of driving mechanism, a radial arm mounted to swing in a fixed plane with respect to said support, a sound box mounted upon said arm, needle changing mechanism at one end of the path of the free end of said arm, means actuated by said mechanism for swinging said sound box with respect to said arm at the other end of said path and for returning said arm over its path to bring said sound box in operative position with respect to said needle changing mechanism.

80. In a talking machine, the combination of a laterally movable sound conducting device, a sound box connected thereto, and means to prevent the lateral movement of the said sound conducting device and said sound box when the talking machine is not in operation, said means being thrown automatically out of operation at the beginning of the operation of the machine.

81. In a talking machine, the combination with driving mechanism, of a movable needle holder, and stationary needle changing mechanism actuated by said driving mechanism for inserting a needle laterally into said holder.

82. In a talking machine, the combination with driving mechanism, of a needle holder, and needle changing mechanism having an element actuated by said driving mechanism for positively pushing a needle laterally into said holder.

83. In a talking machine, the combination with driving mechanism of a swinging sound box, and stationary needle changing mechanism for said sound box actuated by said driving mechanism for automatically inserting a needle into said sound box from one side thereof.

84. In a talking machine, the combination with driving mechanism, of a movable record carrier, and two members actuated by said driving mechanism and engaging said carrier alternately to move said carrier in opposite directions respectively.

85. In a talking machine, the combination with a record carrier mounted to oscillate, of two members engaging said carrier alternately upon opposite sides respectively of the axis of oscillation of said carrier to swing said carrier in opposite directions.

86. In a talking machine, the combination with a vertically movable turntable, of a record carrier movable over said turntable, and means for raising said turntable after said carrier has been moved into operative position over said turntable to lift a record from said carrier.

87. In a talking machine, the combination with a record turntable, of a record carrier, and means for moving said turntable axially to deposit a record upon said carrier.

88. In a talking machine, the combination with a record turntable, of a record carrier, and means for moving said turntable axially to remove a record from said carrier and to redeposit the same thereon.

89. In a talking machine, the combination with a rotary record support, of driving mechanism therefor, a plurality of record carriers, a support for said carriers movable with respect to said record support, means for adjusting the support of said carriers with respect to said record support, a brake for said driving mechanism, and means actuated by the release of said brake for locking the said carrier support in position.

90. In a talking machine, the combination of an arm pivoted to swing about a transverse axis, a sound box carried by said arm, driving mechanism for the talking machine, a locking piece for said arm and means actuated by said driving mechanism for throwing said locking piece into and out of action.

91. In a talking machine, the combination of a movable sound-conducting device, a sound-box suitably connected thereto, a device for driving the talking machine, a rod moved by this driving device, a second rod controlled by the first mentioned rod, a locking hook loosely mounted on the second rod and a locking arm secured to the sound-conducting device which locking arm is released by said locking hook at the beginning of the operation of the machine and is locked again on cessation of said operation.

92. In a talking machine, the combination of a movable sound-conducting device, a sound-box suitably connected therewith, a device for driving the talking machine, a rod moved by this driving device, a second rod controlled by the first mentioned rod, a yielding locking hook loosely mounted on the second rod, a locking arm which coacts with this locking hook and which is arranged on the sound-conducting device, and an arm rigidly connected to said second rod for throwing the locking arm of the sound-conducting device out of engagement with said locking hook during the motion of the second rod in one direction.

93. In a talking machine, the combination of a movable sound conducting device, a sound-box suitably connected therewith, a device for driving the talking machine, a rod moved from this driving device, a second rod controlled by the first mentioned rod, a locking hook loosely mounted on the second rod, a locking arm secured to the sound-conducting device and coacting with the said locking hook, which locking arm is released from said locking hook at the beginning of the operation of the machine and is locked again on the cessation of said operation, and a spring connected to said second rod, which spring is stressed by the motion of said rod in one direction and as it is unstressed affects the automatic return motion of the rod.

94. In a talking machine, the combination with a laterally movable sound conducting device, of a record support, of means to lock said sound conducting device, when said sound conducting device is swung laterally to one side of said support.

95. In a talking machine, the combination with a laterally movable sound conducting device, of a record support, of means to lock said sound conducting device when said sound conducting device is swung laterally to one side of said support, and means to unlock said device at the beginning of the operation of said talking machine.

96. In a talking machine, the combination with a rotatable record support, of a record holder, means to remove a record from said holder and to place it upon said support, and means to start the rotation of said support before said record is deposited upon the same.

97. In a talking machine, the combination with a rotary record support, of a sound box mounted to swing across said support, driving mechanism for said support and means actuated by said driving mechanism for moving said sound box away from said support into an inverted position.

98. In a talking machine, the combination with a rotary record support, of a sound box mounted to swing across said support, driving mechanism for said support and means actuated by said driving mechanism for moving said sound box away from said support into an inverted position, and means actuated by said driving mechanism for returning said sound box toward said support.

99. In a talking machine the combination of a vertically movable supporting frame with a vertical shaft carried by said frame, carrier frames for removably supporting records pivoted in vertical series upon said shaft, a rotatable record support, means for driving said support and means for removing a record from its respective carrier frame to said rotatable support, said last-named means being operated by said driving means.

100. In a talking machine, the combination of a rotary support for talking machine records, with a magazine comprising a plurality of carriers for supporting records, and means actuated through a rack and pinion to shift a carrier and its respective record selectively from said magazine toward said support.

101. In a talking machine, the combination of a rotary support for talking machine records, with a magazine comprising a plurality of vertically disposed carriers for supporting records, and means automatically actuated to shift a carrier and its record selectively from said magazine toward said support.

102. In a talking machine, the combination of a rotary support for talking machine records, with a magazine comprising a plurality of vertically disposed carriers for supporting records arranged to swing about a single axis, and means automatically actuated to shift a carrier and its respective record selectively from said magazine toward said support.

103. In a talking machine, the combination of a rotary support for talking machine records, with a magazine comprising a frame, a plurality of carriers carried by said frame for supporting records and arranged to swing about a single axis, and means automatically actuated to shift a carrier and its respective record selectively from said magazine toward said support.

104. In a talking machine, the combination of a rotary support for talking machine records, with a magazine for talking machine records, including a plurality of carriers for supporting records and arranged to be shifted vertically, and means automatically actuated to selectively shift a carrier and its record from said frame into alinement with said rotary support.

105. In a talking machine, the combination of a rotary support for talking machine records, with a magazine for talking machine records, a plurality of carriers for supporting records carried by said magazine, and means automatically actuated to selectively shift a carrier and its record from said frame into approximate alinement with said rotary support, and means to indicate the position of said magazine.

106. In a talking machine, the combination of a rotary support for talking machine records, with driving mechanism therefor, a magazine for talking machine records, means for manually shifting said magazine, a plurality of carriers for supporting the records carried by said magazine, and means automatically actuated by said mechanism to selectively shift a record from said magazine into substantial alinement with said rotary support.

107. In a talking machine, the combination of a rotary support for talking machine records, with driving mechanism therefor, a magazine for talking machine records, means for manually shifting said magazine, a plurality of carriers for supporting the records carried by said magazine, and means automatically actuated by said mechanism to selectively shift a record from said magazine into substantial alinement with said rotary support, and to shift said record back toward said magazine after being played.

108. In a talking machine the combination of a rotary support for talking machine records, with driving mechanism therefor, a magazine for talking machine records, means for manually shifting said magazine, a plurality of carriers for supporting the records carried by said magazine, and means automatically actuated by said mechanism to selectively shift a record from said magazine into substantial alinement with said rotary support and to shift said record back to its original position in said magazine.

109. In a talking machine, the combination of a rotary support for talking machine records, with a magazine for talking machine records including a plurality of carriers for supporting disk records, and means automatically actuated to selectively shift one of said carriers and its respective disk record from said magazine into alinement with said rotary support.

110. In a talking machine, the combination of a rotary support for talking machine records, with a magazine for talking machine records, a plurality of carriers for supporting records carried by said magazine, and means automatically actuated to selectively shift a carrier and its record from said magazine into alinement with said rotary support, and to return the same to said magazine.

111. In a talking machine, the combination of a rotary support for talking machine records, with driving mechanism therefor, a magazine, a plurality of carriers for supporting disk talking machine records carried by said magazine, and means automatically actuated by said mechanism to selectively shift a disk record from said magazine into alinement with said rotary support, and to return the same to said magazine.

112. In a talking machine, the combination of a rotary support for talking machine records, with actuating means therefor, a magazine comprising a plurality of carriers for holding disk talking machine records, and means automatically actuated by said actuating mechanism for moving one of said carriers with its respective record selectively from said magazine toward said rotary support.

113. In a talking machine, the combination of a rotary support for talking machine records, with actuating means therefor, a magazine comprising a plurality of carriers for holding disk talking machine records, and means automatically actuated by said actuating mechanism for moving one of said carriers with its respective record from said magazine toward said rotary support.

114. In a talking machine, the combination of a rotary support for talking machine records with actuating means therefor, a magazine comprising a plurality of carriers for holding disk talking machine records, and means automatically actuated by said actuating mechanism for moving one of said carriers with its respective record selectively from said magazine toward said rotary support, and for returning the same to said magazine.

115. In a talking machine, the combination of a rotary support for talking machine records, with driving mechanism therefor, a magazine for talking machine records, a plurality of carriers for supporting records carried by said magazine, and means automatically actuated by said mechanism to selectively shift a carrier and its record from said magazine into alinement with said rotary support, and for returning said carrier and record directly to their original positions in and with respect to said magazine.

116. In a talking machine the combination of a rotary support for talking machine records, driving mechanism therefor, a plurality of record carriers arranged to be shifted, and means to shift any one of said carriers selectively toward said support.

117. In a talking machine the combination of a rotary support for talking machine records, driving mechanism therefor, a plurality of record carriers arranged to be shifted, and means to shift any one of said carriers selectively toward said support, and to return said carrier to said magazine.

118. In a talking machine the combination of a rotary support for talking machine records, driving mechanism therefor, a plurality of record carriers arranged to be shifted, and means to shift any one of said carriers selectively toward said support, and to return said carrier to its original position in said magazine.

119. In a talking machine, the combination of a rotary support for talking machine records, driving mechanism therefor, a plurality of record carriers arranged to be shifted, and means actuated by said driving mechanism to shift any one of said carriers selectively toward said support.

120. In a talking machine, the combination of a rotary support for talking machine records, driving mechanism therefor, a plurality of record carriers arranged to be shifted, and means actuated by said driving mechanisms to shift any one of said carriers toward said support.

121. In a talking machine, the combination of a rotary support for talking machine records, driving mechanism therefor, a plurality of record carriers arranged to be shifted, and means actuated by said driving mechanism to shift any one of said carriers toward said support and to return said shifted carrier to its original position in said magazine.

122. In a talking machine, the combination of a rotary support for talking machine records, driving mechanism therefor, a plurality of record carriers arranged to be shifted, and means actuated by said driving mechanism to shift any one of said carriers toward said support and to return said shifted carrier to its original position in said magazine after its respective record has been played.

123. In a talking machine, the combination of a rotary support for talking machine records, driving mechanism therefor, a plurality of record carriers arranged to be shifted, and means to shift any one of said carriers and its respective record selectively toward said support, to remove said record from said carrier to said support, to replace said record upon said carrier when said record has been played, and to return said carrier and record to their original places in said magazine.

124. In a talking machine, the combination of a rotary support for talking machine records, driving mechanism therefor, a plurality of record carriers arranged to be shifted, and means actuated by said driving mechanism to shift any one of said carriers and its respective record selectively toward said support, to remove said record from said carrier to said support, to place said record upon said carrier when said record has been played, and to return said carrier and record to their original places in said magazine.

125. A talking machine comprising a magazine for holding talking machine records, a rotary support for talking machine records, mechanism to actuate said support, means actuated by said mechanism to transfer a talking machine record from said magazine to said support and to return said record to said magazine when the reproduction thereof is completed, and means to stop said machine after said record has been returned to said magazine.

126. A talking machine comprising a magazine for holding talking machine records, a rotary support for talking machine records, mechanism to actuate said support, means actuated by said mechanism to transfer a talking machine record from said magazine to said support and to return said record to said magazine when the reproduction thereof is completed, and means actuated by said mechanism to stop said machine after said record has been returned to said magazine.

127. A talking machine comprising a magazine for holding talking machine records, a rotary support for talking machine records, mechanism to actuate said support, means actuated by said mechanism to selectively transfer a talking machine record from said mechanism to said support and to return said record to said magazine when the reproduction thereof is completed, and means to stop said machine after said record has been returned to said magazine.

128. A talking machine comprising a magazine for holding talking machine records, a rotary support for talking machine records, mechanism to actuate said support, means actuated by said mechanism to transfer a talking machine record from said magazine to said support and to return said record to its original position in said magazine when the reproduction thereof is completed, and means to stop said machine after said record has been returned to said magazine.

129. A talking machine comprising a magazine for holding talking machine records, a rotary support for talking machine records, mechanism to actuate said support, means actuated by said mechanism to selectively transfer a talking machine record from said magazine to said support and to return said record to its original position in said magazine when the reproduction thereof is completed, and means actuated by said mechanism to stop said machine after said record has been returned to said magazine.

130. A talking machine comprising a magazine for talking machine records, a rotatable support for talking machine records, means for actuating said talking machine, means automatically operated by said actuating means to transfer a talking machine record from said magazine to said support and back to said magazine, and means to stop said machine after said record has been returned to said magazine.

131. A talking machine comprising a magazine for talking machine records, a rotatable support for talking machine records, means for actuating said talking machine, means automatically operated by said actuating means to transfer a talking machine record from said magazine to said support and back to its original position in said magazine, and means to stop said machine after said record has been returned to said magazine.

132. A talking machine comprising a magazine for talking machine records, a rotatable support for talking machine records, means for actuating said talking machine, selective means automatically operated by said actuating means to transfer a talking machine record from said magazine to said support and back to said magazine, and means to stop said machine after said record has been returned to said magazine.

133. A talking machine comprising a magazine for talking machine records, a rotatable support for talking machine records, means for actuating said talking machine, selective means automatically operated by said actuating means to transfer a talking machine record from said magazine to said support and back to its original position in said magazine, and means to stop said machine after said record has been returned to said magazine.

134. A talking machine comprising a magazine for talking machine records, a rotatable support for talking machine records, means for actuating said machine, means automatically operated by said actuating means to transfer a talking machine record from said magazine to said support and back to said magazine, and means to automatically stop said machine after said record has been returned to said magazine.

135. A talking machine comprising a magazine for talking machine records, a rotatable support for talking machine records, means for actuating said machine, means automatically operated by said actuating means to transfer a talking machine record from said magazine to said support and back to its original position in said magazine, and means to automatically stop said machine after said record has been returned to said magazine.

136. A talking machine comprising a magazine for talking machine records, a rotatable support for talking machine records, means for actuating said machine, selective means automatically operated by said actuating means to transfer a talking machine record from said magazine to said support and back to said magazine, and means to automatically stop said machine after said record has been returned to said magazine.

137. A talking machine comprising a magazine for talking machine records, a rotatable support for talking machine records, means for actuating said machine, selective means automatically operated by said actuating means to transfer a talking machine record from said magazine to said support and back to its original position in said magazine, and means to automatically stop said machine after said record has been returned to said magazine.

138. In a talking machine, the combination with a record support, of sound reproducing means movable into and out of operative position with respect to said support, means for holding said sound box in an inverted inoperative position, and stylus changing mechanism in operative position with respect to said sound reproducing means when said sound reproducing means is in said inverted position.

In testimony whereof I have signed my name to this specification in the presence of two subscribing witnesses.

CLARENCE VOGT.

Witnesses:
LLEWELLYN W. COLLINGS,
CHARLES K. HADDON.

It is hereby certified that in Letters Patent No. 1,034,664, granted August 6, 1912, upon the application of Clarence Vogt, of Berlin, Germany, for an improvement in "Talking-Machines," errors appear in the printed specification requiring correction as follows: Page 3, line 13, for the word "has" read *have;* same page, line 87, strike out the syllables and words "lating about, which pin. The pivot-pin 56" and insert the syllables and words *lating about the pivot-pin 56, which pin;* and page 9, line 57, before the word "rod" insert the word *main;* and that the said Letters Patent should be read with these corrections therein that the same may conform to the record of the case in the Patent Office.

Signed and sealed this 17th day of September, A. D., 1912.

[SEAL.]
C. C. BILLINGS,
*Acting Commissioner of Patents.*